United States Patent [19]

Ebner et al.

[11] 4,002,837
[45] Jan. 11, 1977

[54] TRANSCEIVER

[75] Inventors: Theran L. Ebner; Donald W. Hawkins, both of Houston, Tex.

[73] Assignee: Houston Natural Gas Corporation, Houston, Tex.

[22] Filed: Sept. 17, 1975

[21] Appl. No.: 614,035

[52] U.S. Cl. .............................. 179/2 AM; 340/150
[51] Int. Cl.² .......................................... H04Q 9/00
[58] Field of Search ............. 179/2 AM, 2 A, 2 DP; 340/172.5, 151

[56] References Cited
UNITED STATES PATENTS

| | | | |
|---|---|---|---|
| 3,700,816 | 10/1972 | Evans | 179/2 DP |
| 3,820,075 | 6/1974 | Ebner | 340/172.5 |
| 3,842,218 | 10/1974 | DeLuca | 179/2 A |
| 3,899,639 | 8/1975 | Cleveley | 179/2 A |

*Primary Examiner*—Kathleen H. Claffy
*Assistant Examiner*—Joseph A. Popek
*Attorney, Agent, or Firm*—Fulbright & Jaworski

[57] ABSTRACT

A data receiver for transmitting interrogating signals to activate in sequence a plurality of data transponders, receiving data from the transponders, processing the data, correcting the data, storing the data in a temporary memory, and delivering the data to output equipment. Preferably, the transceiver may be used with a switched telephone network. Means are provided to detect when the telephone subscriber goes "off hook" and releases the line to the subscriber. The transceiver includes means to detect failure of response and stores signals indicating failures. Means are provided to transmit a second interrogation signal in a polarity opposite to the first to overcome the effect of a reversed subscriber line pair.

15 Claims, 20 Drawing Figures

Fig. 3

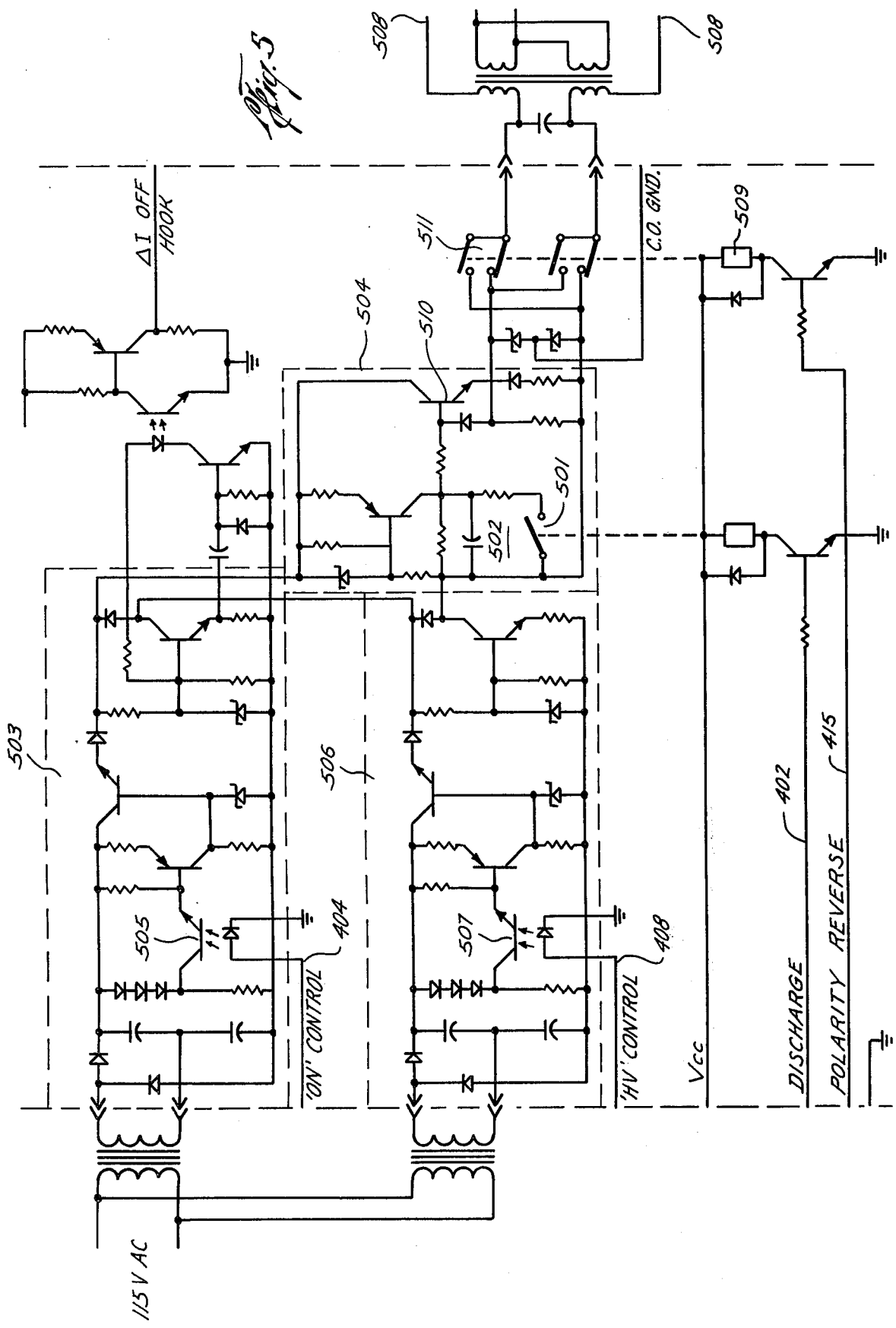

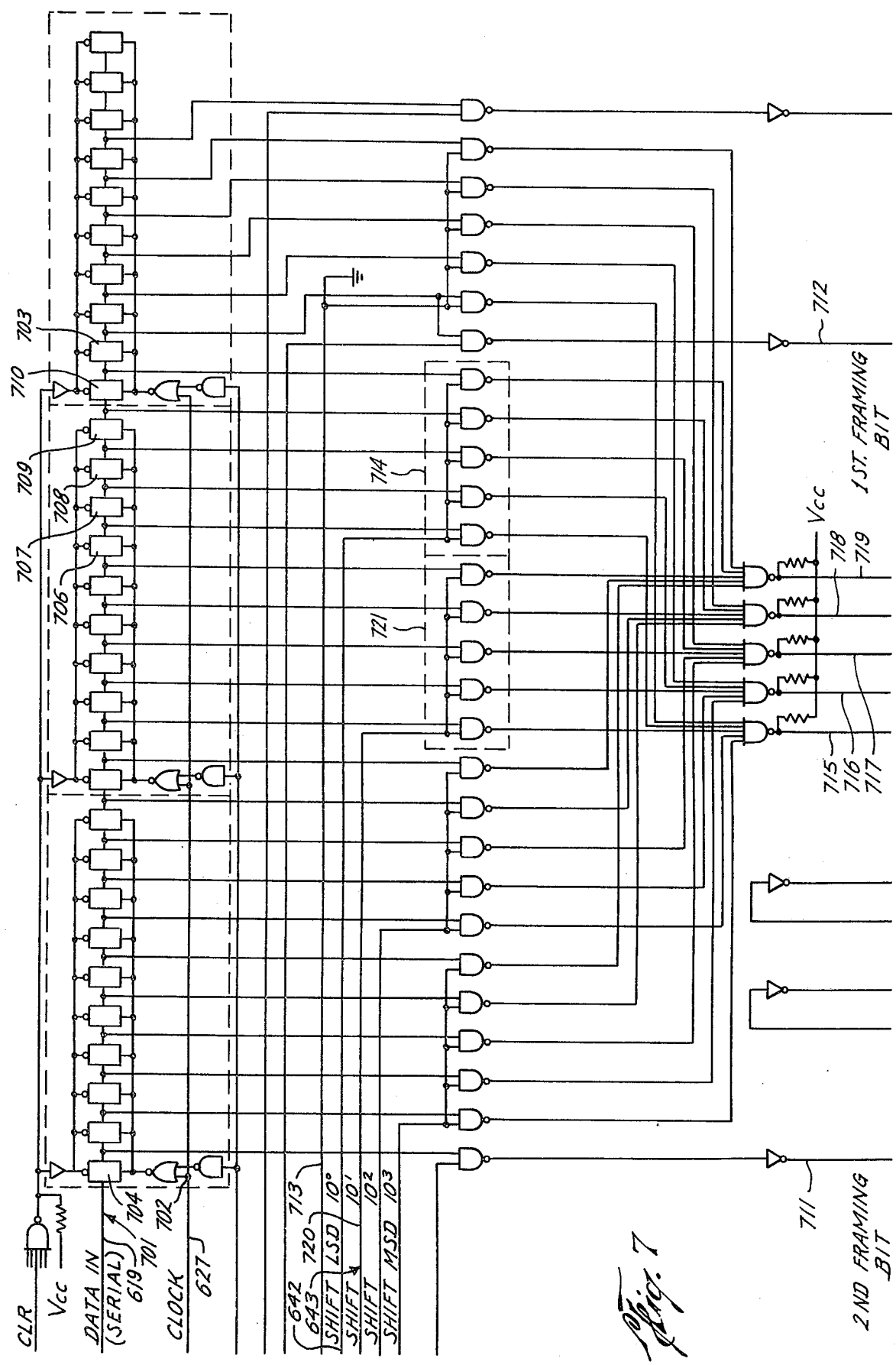

TRANSCEIVER

BACKGROUND OF THE INVENTION

Generally, data receivers for use in utility automatic meter reading have been proposed. Various methods have been employed to insure accuracy and compatability with both the communications medium employed and transponders furnishing the data. While data gathering systems approaching accuracies of 100 percent are in common use today, such systems are very expensive to manufacture and maintain. Some systems such as gas, water and electric utility meter reading systems need not be capable of these accuracies. The relatively low cost of the product does not justify the cost of extreme accuracies in either measurement or data gathering. In addition, the magnitude of the number of "points of sale" — in the hundreds of millions — requires consideration of the cost of transponder and encoder devices installed at each meter.

A practical utility meter reading system, therefore, comprises accuracy to an acceptable level in order to meet the economic needs of the system.

Having comprised accuracy at the point of data delivery then, by using the least expensive technique available, it is desirable to define inaccuracies as completely as possible so that they may be recognized and appropriate measures taken to correct the data at the data collection center where expense will be minimal.

Certain other deficiencies are apparent in previous designs. Where the system is to be used to receive data over a switched telephone network, it is highly desirable for the data receiver to include signalling means to activate a transponder to which it may be connected at a given instant. Additionally, it is desirable in both the technological and economic sense that it differentiate between single and multiple party lines. The ability to control the connection to the subscriber telephone line during the data transmission interval is also necessary in order to insure minimal interference with a subscriber's use of his telephone.

The present invention is directed towards various improvements in a data receiver which is capable of operation in a single receiving mode and a plurality of transmitting modes and which has the ability to release the telephone line to the subscriber should he so request. It is also directed toward a data receiver which has the ability to detect certain invalid data and correct it in order to enhance overall accuracy.

SUMMARY

The present invention is directed toward a data transceiver for receiving data, processing it, correcting and storing it in temporary memory and delivering it to output equipment through an interface. In the preferred embodiment, it is designed for use with a switched telephone network; however it is readily adaptable for use through other communication mediums.

It is one object of the invention to provide a data transceiver capable of operation over a switched telephone network to transmit DC activating signals via a typical single-party subscriber line to interrogate a data transponder unit connected at the subscriber end when so instructed by a line accessing system.

It is a further object of the invention to provide a data transceiver for operation via multi-party telephone lines which transmits a DC pre-activating signal via the multi-party line complex to cause a plurality of transponders to consume power sufficient to minimize effects of line conditioning devices such as bridge lifters connected to the lines and thereafter transmit a voice band tone to selectively interrogate a single transponder of the plurality when so instructed by the line accessing system.

Another object of the invention is to provide a data transceiver which is designed to receive, store in temporary memory, decode, correct for encoding and transmission/reception errors, and transfer to output memory digital data transmitted in a trinary-return-to-zero signalling format.

Still another object of the invention is to provide a data transceiver which includes means to detect the telephone subscriber going off hook during the data transmission interval and signal the line accessing system to release the line to the subscriber.

Another object of the invention is to provide a data transceiver which includes means to detect failure of response to an interrogation signal by a transponder and store mnemonics so indicating. Upon detecting such a failure, the transceiver transmits a second interrogation signal in a polarity opposite to the first to overcome the effect of a reversed subscriber line pair which would prevent activating a transponder in the normal polarity. A second failure to respond is also stored in memory.

Another object of the invention is to provide a transceiver which includes means to signal the line accessing system to drop the connection upon receipt of data, recognition of certain supervisory conditions, or upon expiration of a specific time interval.

Another object of the invention is to provide a data receiver which includes means to transfer data in its output memories to the line accessing system through an interface as required by the line accessing system when the latter is signalled that data is available.

These and other objects of the invention will be more fully understood by referring to the following drawings and circuit descriptions.

BRIEF DESCRIPTION OF THE DRAWINGS

FIG. 3 is a tabulation of the relationship including permutations of the digits which may occur due to certain encoding errors.

FIG. 5 is a schematic of the alert power circuits.

FIG. 7 is a schematic diagram of the buffer memory circuits.

DESCRIPTION OF THE PREFERRED EMBODIMENT

Figure 1:
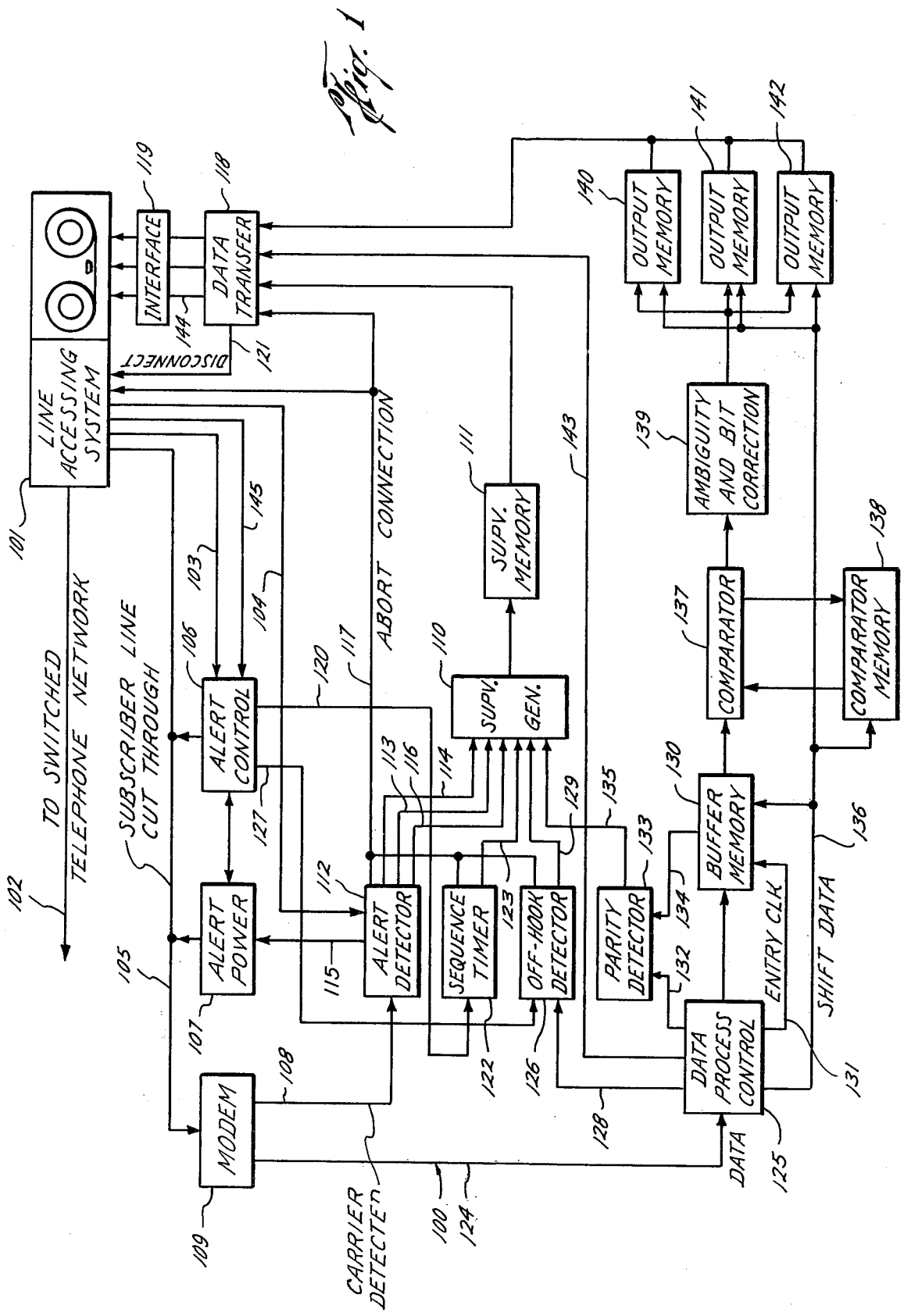
FIG. 1 is a simplified block diagram of the present invention shown connected to the switched telephone network through a line accessing means.

The data receiver may be considered as a two-part device which has connected to its input port a system which sequentially connects to subscriber telephone lines. As each line is connected, the transceiver is instructed by a line accessing system to transmit a specific signal which will cause a transponder at the station end of the line to transmit data.

A supervisory sequence is initiated at the time each subscriber line is connected to the transceiver to insure subscriber priority use of the line. The sequence is multipurpose and consists of the following elements:

1. Timing circuits which signal the line accessing system to release the line after a prescribed time to insure that sequence failure within the transceiver does not allow a line to remain connected indefinitely.

2. An access timer which causes a second alerting sequence to occur, in a polarity opposite to the first, if the transponder fails to respond to the first attempt. The timer also signals the line accessing system to release the line if the transponder fails to respond a second time.

3. A multi-mode detector which causes the line to be released in the event the subscriber lifts his receiver during the time that data is being transmitted.

4. An end-of-data signal which releases the line when data transmission is completed.

5. Diagnostic signals which identify and record the reason for aborting the line connection.

Under normal operation, the station transponder responds to the alerting signal and transmits its data in a bit serial trinary signalling (return-to-zero) mode, beginning with the least significant digit of a meter reading and continuing through three or four digits sequentially to finally transmit the fourth or fifth digit which is the most significant. Each meter reading is preceded and followed by a framing bit and includes timing bits interspersed between binary data bits.

In the preferred embodiment, a total of three meter readings are received. Upon completion of the third reading, the connection is dropped and the system moves to the next line to be interrogated.

Incoming data is first stored in a buffer memory circuit. When the last framing bit of the first meter reading is entered into memory, the stored reading is first examined to insure that two conditions are met:

1. The data work consists of a total of 22 bits (five each for four digits plus two framing bits).

2. The bits in the framing bit positions of the buffer memory are both binary ones.

In the event that both conditions are not met, a supervisory mnemonic is stored in the supervisory memory of the transcriber indicating that the reading failed the parity test.

Upon completion of the parity test, data processing begins. Parity testing and processing occurs during the bit interval of te second framing bit of each meter reading or, in other words, during the 22nd, 43rd and 64th bit interval.

The essential steps of the data processing sequence are:

1. Decode the LSD (lowest significant digit) of the reading in the buffer memory and transfer it to the output memory.

2. Determine which of the following descriptions categorize the digit and store the category in the comparator memory.
   a. 0', 0. or 0''
   b. 1' or 1
   c. Any number in the range 1'' through 8' d. 8 or 8''
   e. 9', 9 or 9'' f. Nil character (X), N character A more complete explanation of this determination may be found in U.S. Pat. Nos. 3,683,368 and 3,820,075.

3. Decode the next most significant digit (NMSD) in the buffer memory (the second digit of the reading). Compare the digit with the information in the comparator memory concerning the first digit. If the LSD of the comparison is either A 0 or A 9, correct the NMSD if necessary.

4. Categorize the corrected digit as in Step 2 above and store the information in the comparator memory. Transfer the corrected digit to the output memory.

5. Decode the third digit; compare it with information in the comparator memory for the second digit—correct it—categorize and store in the comparator memory—transfer to the output-memory.

6. Decode the fourth digit and process it as before, comparing it with the third digit, and transfer it to the output memory.

The second and third meter readings are processed in the same manner. Upon completion of processing of the third reading, data is presented at the output port of the transceiver where it is transferred through the interface to the line accessing device which contains suitable output equipment to record the data, i.e., magnetic tape.

The subscriber line is released when data is presented at the output port of the transceiver which occurs as a result of supervisory sequences outlined above or upon completion of the third meter reading data processing. The line accessing device then presents the next line to be interrogated to the transceiver.

Error correction means have been adequately provided by circuitry disclosed in U.S. Pat. Nos. 3,683,368 and 3,820,075 with regard to those experienced in the transitional zones at 0 to 9.

The present transceiver is directed toward an improvement in error correction with regard to errors which may occur as a result of, i.e., encoder contact failure causing a single binary 1 bit to be transmitted as a binary 0.

Figure 2:
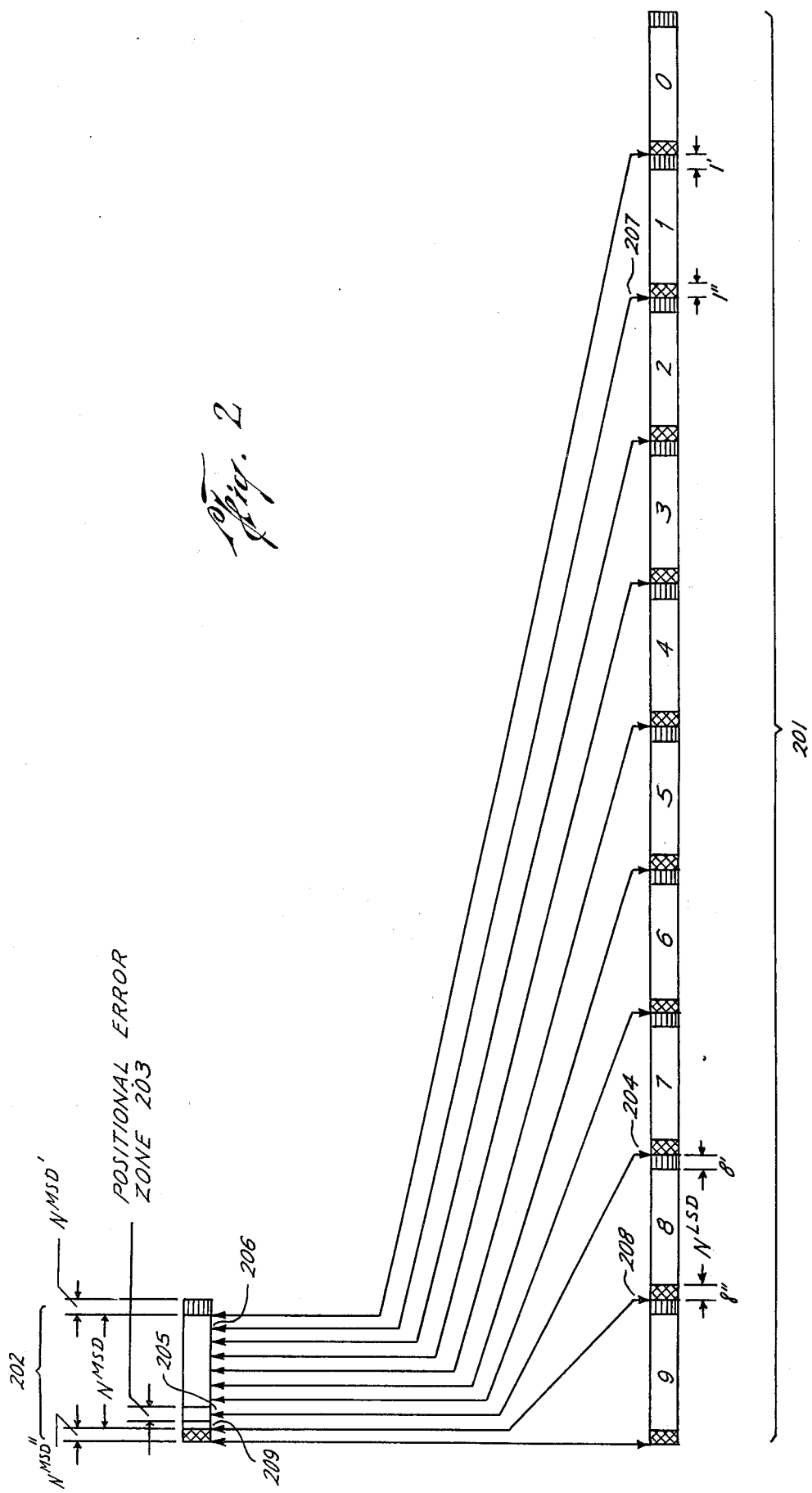
FIG. 2 is an illustration of the mechanical relationship between digits of a typical encoding device originating data to be processed by the present invention.
Figure 4A:
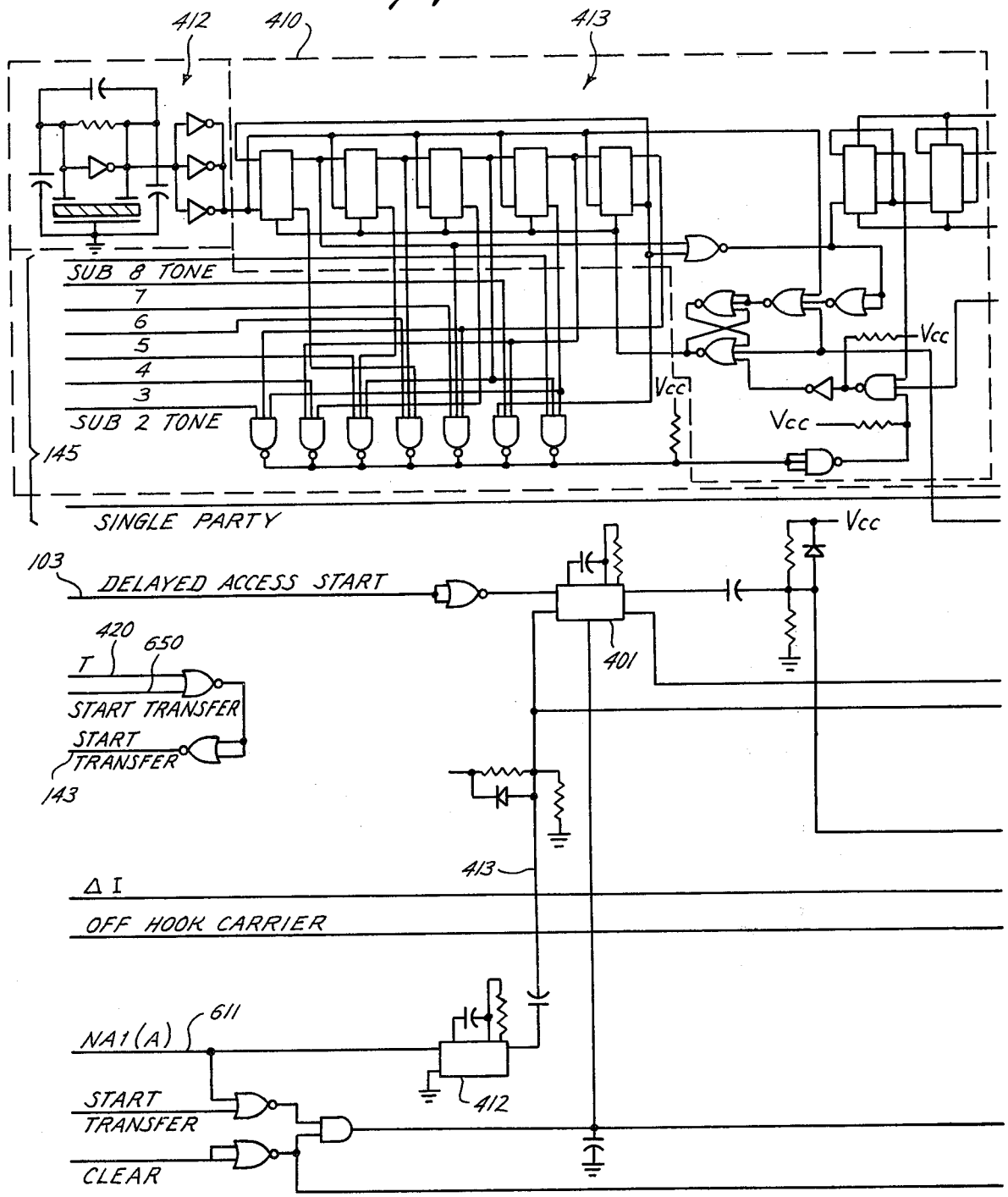
FIGS. 4A and 4B taken together are a schematic of the alert control circuits.
Figure 4B:
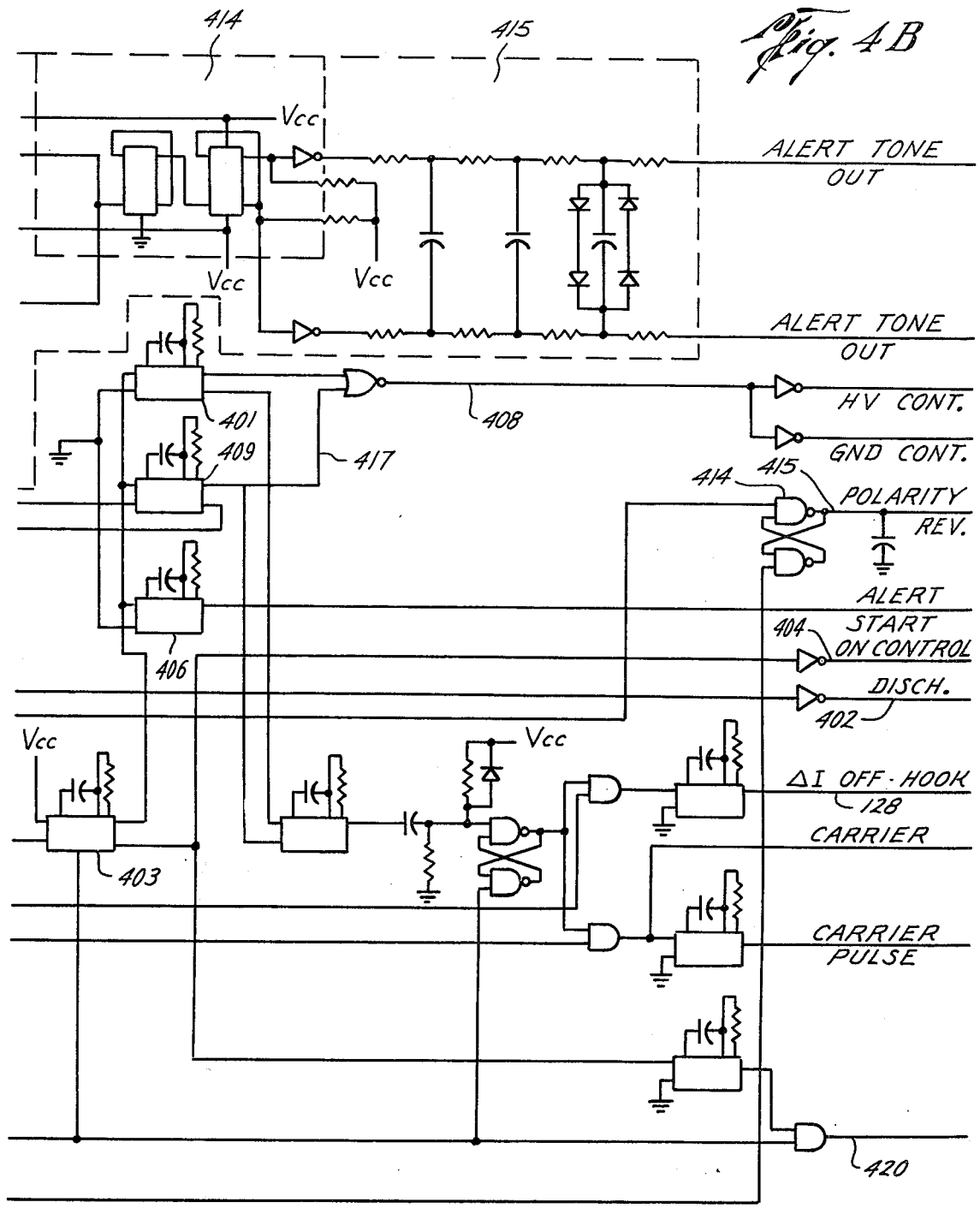
Figure 6A:
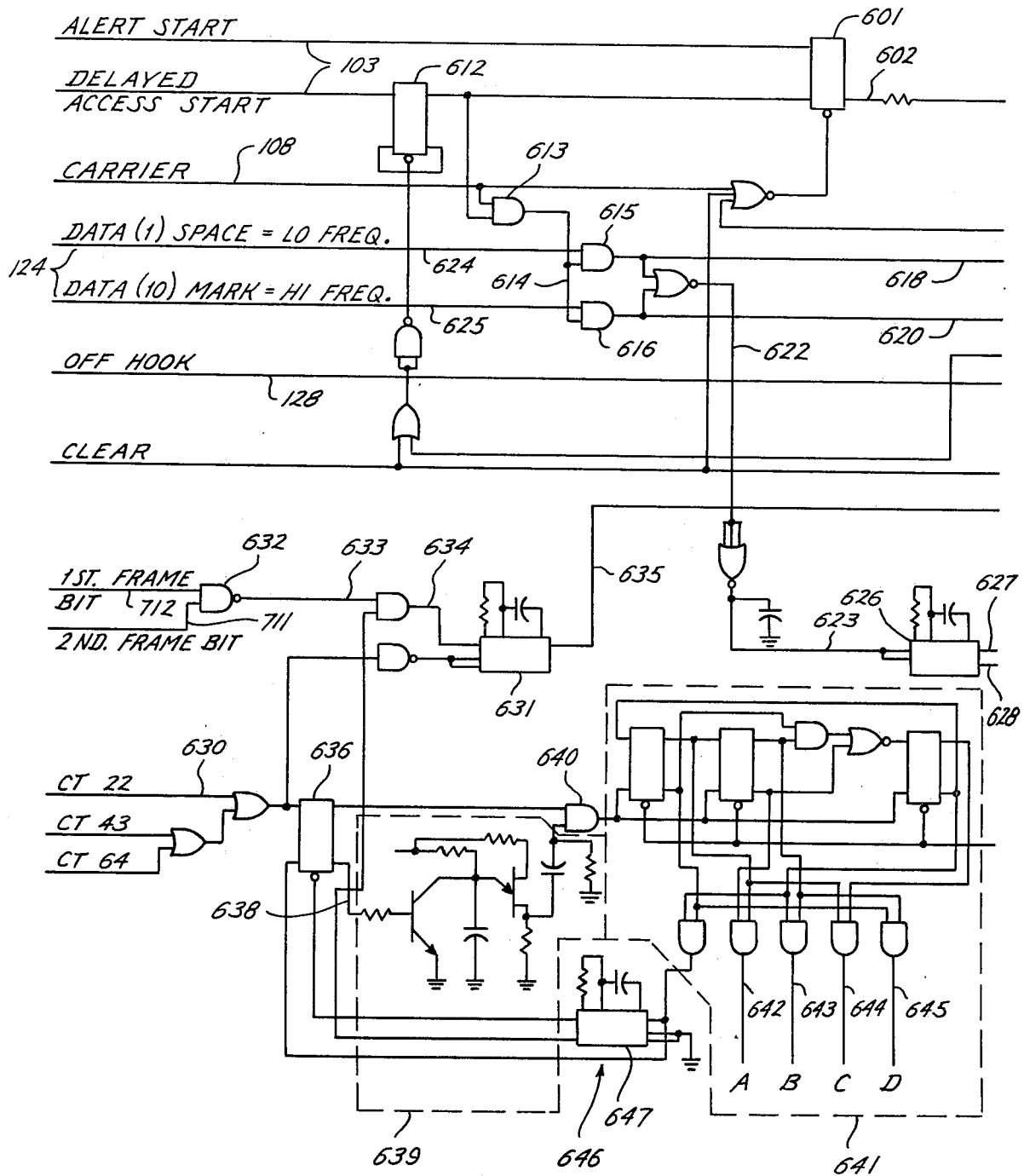
FIGS. 6A and 6B taken togather are a schematic diagram of data processing control circuits.
Figure 6B:
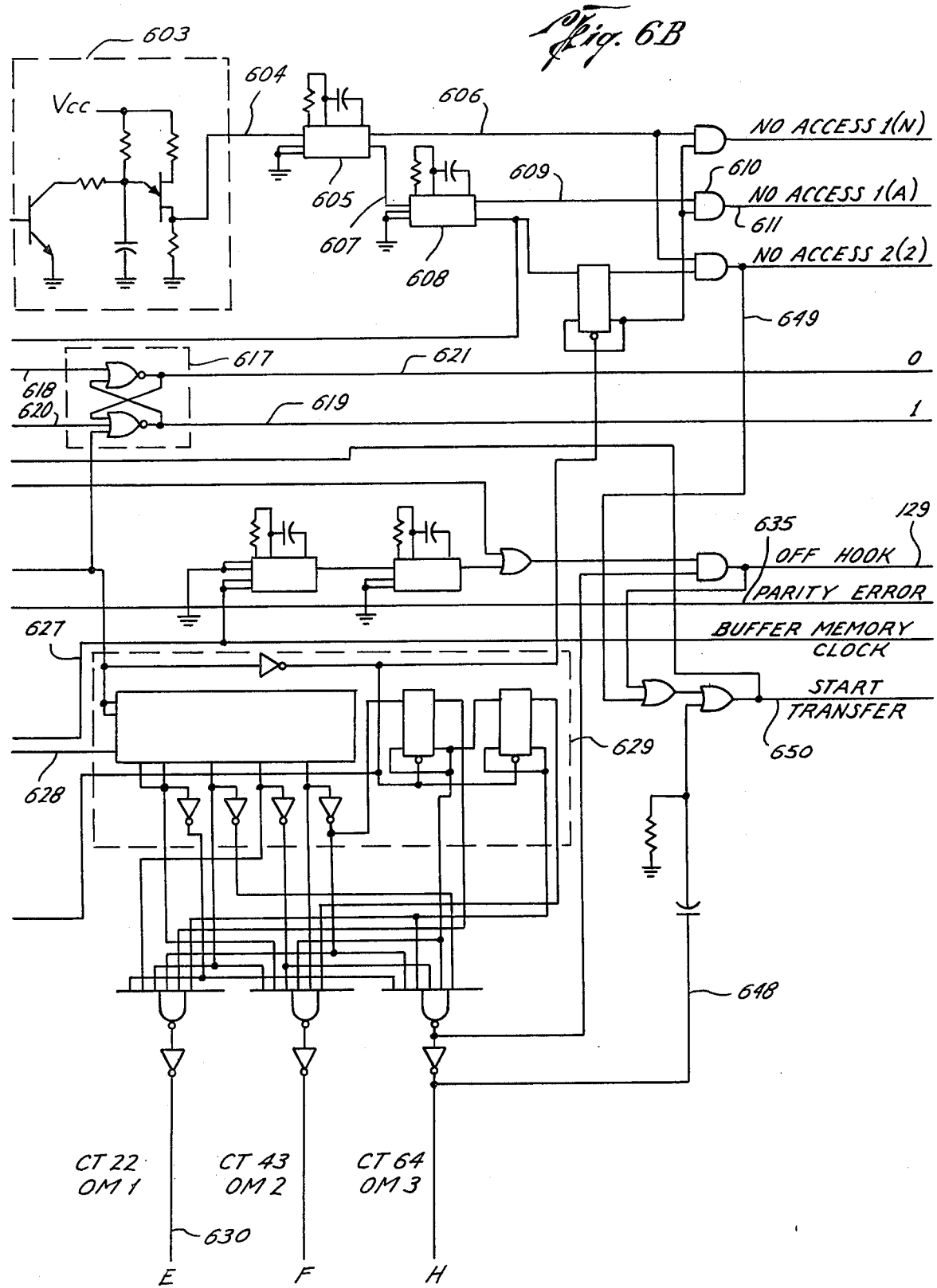

FIG. 2 illustrates the mechanical relationship between two dials on the encoder. 201 represents one complete turn of the LSD dial. 202 represents one digit of the NMSD dial which is geared to the LSD dial in a ratio 1:10. In other words, as LSD encoding contacts move through one complete turn 0---9, NMSD encoding contacts move through 1/10 turn of one numeric (digit) position.

203 illustrates the maximum positional error zone that may exist in the encoding contacts of the NMSD. For example, if the LSD encoded in 8' or less, $N^{msd}$ must be the number encoded; $N^{msd'}$ or $N^{msd''}$ cannot occur. Similarly, if we examine positions 207 and 206 within the confines of 203 applied to 206, the same condition exists. It is obvious then that when $N^{lsd}$ is any number between 1'' and 8', $N^{msd'}$ and $N^{msd''}$ digits are erroneous, due possibly to encoder contact failure, transmission or reception error, or other causes.

Similarly, at position 208 of LSD, 209 would occur and $N^{msd}$ or $N^{mds''}$ would be acceptable digits when $N^{lsd}$ is either 8 or 8''. A similar circumstance exists when $N^{lsd}$ is either 1' or 1 and $N^{msd}$ is legitimately $N^{msd'}$ or $N^{msd}$.

Figure 3:
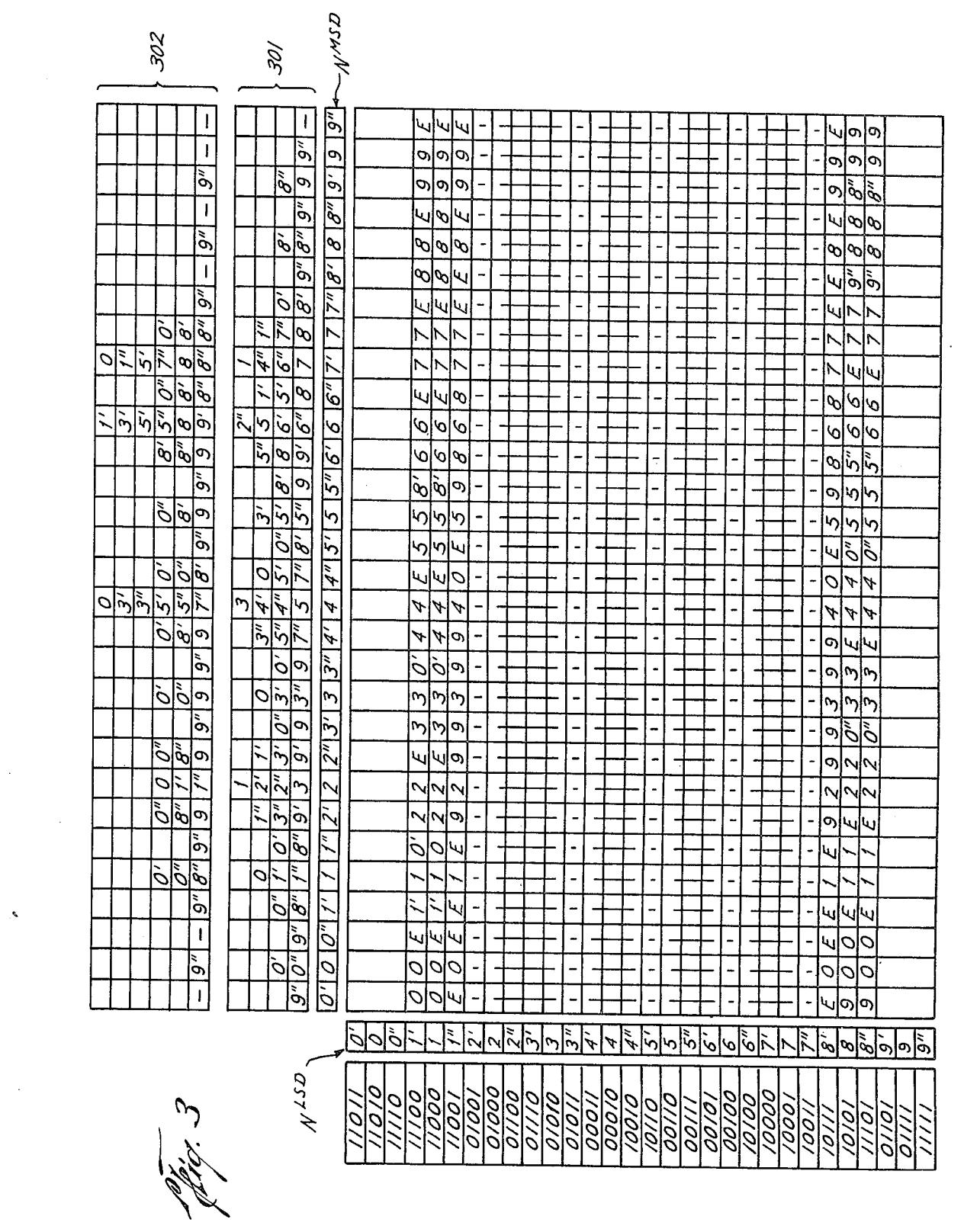

The comparator circuitry includes means to recognize the erroneous $N^{msd}$ digit condition and either correct it or indicate—by storing a mnemonic (E) in its place in the output memory—that it cannot be resolved. The basis for the corrections are illustrated in FIG. 3.

Assume for example that in a typical comprison, $N^{lsd}$ is 1'' and $N^{msd}$ is 4''. The binary code for 4'' is 10010. Recognizing that the mechanical relationship between $N^{lsd}$ and $N^{msd}$ encoding contacts does not permit any $N^{msd''}$ number to be encoded when $N^{lsd}$ is 1'', it is apparent that the 4'' code 10010 must be a permutation of the correct number.

Assuming that the permutation is the result of a single bit error, it is apparent that 11010(0), 10110(5') and 10011(7'') could permute to 10010. 301 indicates single bit permutations for each $N^{msd}$ digit.

If we assume a two bit error occurred and produced the erroneous digit, then the permutations are 0'', 0' and 8' as shown in 302. 302 is a tabulation of two bit error permutations of all $N^{msd}$ digits.

Of the six possible permutations of 4'', that is, 0, 0', 0'', 5', 7'' and 8', only the 0 conforms to the mechanical restrictions for $N^{msd}$ when $N^{lsd}$ is 1''. The erroneous digit is therefore corrected to 0 and transferred to the output memory.

As an example of an erroneous $N^{msd}$ digit which cannot be logically resolved, assume $N^{lsd}$ is 1'' and $N^{msd}$ is 5' (10110) as indicated in 301 and 302--0'', 8' and 9'' are possible permutations. Note in this instance that mechanical considerations will not permit $N^{msd''}$ or $N^{msd'}$ numbers to be encoded when $N^{lsd}$ is 1'' and therefore, although the error condition is recognized, it cannot be resolved. An E is therefore transferred to memory in lieu of the erroneous digit.

Referring now to the drawings, particularly to FIG. 1, the transceiver of the present invention generally indicated by the reference number 100, will be described, by way of example only, in conjunction with a conventional line accessing system 101 connected via normal test center trunk lines 102 to a switched telephone network. It is assumed that suitable encoding and transponder devices such as shown in U.S. Pat. No. 3,683,368 are connected to the switched network on, for example, subscriber premises for the purpose of transmitting data such as utility meter reading data from a gas, water and electric meter (not shown).

It is the function of the line accessing system 101 to establish a connection between a transponder connected to a subscriber line and the transceiver 100 of the subject invention. The line accessing system 101 is responsible for all functions related to control of the switched network to establish and maintain the connection until instructed to drop the connection by the transceiver 100.

It is the responsibility of the transceiver 100 to interrogate the transponder and process the data received from it while monitoring the line to insure that the line is released to the subscriber in the event he attempts to use it during the interrogation interval.

When the connection has been established, the line accessing system through the line 103 the transceiver 100 to transmit an interrogation signal unique to the particular transponder connected to the line and signals through line 104 the transceiver 100 that a subscriber line connection has been cut through to it in line 105. The subscriber line pair is cut through to the transceiver dry, that is, without central office battery or other voltage connect to it.

Signals 103 and 145 cause alert control 106 and alert power 107 to apply operating power for the transponder to the line 105 and superimpose the discrete interrogation pulse required to activate the transponder upon it.

Signal 104 starts a timer in the alert detector 112 which is either stopped by signal 108 when the carrier is detected by modem 109 or times out after the allotted time when the transponder fails to respond to the interrogation pulse.

Signal 103 is converted to the mnemonic "A" by supervisory generator 110 and stored in the supervisory memory 111.

If alert detector 112 is signalled by 108 that carrier has been detected, 108 is converted to the mnemonic "C" on line 113 and stored in the supervisory memory 111. If the timer times out alert detector 112, signal 114 is converted to the mnemonic "NA" and stored in supervisory memory 111. Alert detector 112 also generates signal 115.

Signal 115 causes alert power 107 to reverse the polarity of operating power and interrogation pulse and repeat the interrogation cycle.

The timer in 112 starts again. If carrier is detected, signal 113 is produced and a C is stored in supervisory memory 111. If no carrier is detected, alert detector 112 generates signal 116 which is converted to a mnemonic 2 and stored in supervisory memory 111.

A diagnostic sequence is therefore performed by interaction of 106, 107, 109, 110 and 112 which places the following information in supervisory memory 111.

1. "AC"— Interrogation attempted - carrier received.
2. "ANAC" — Interrogation attempted — first attempt failed - second attempt, carrier detected.
3. "ANA2" — Interrogation attempted — both attempts failed.

AC is a normal response to interrogation and would be followed by data.

ANAC is a response which indicates that the polarity of the subscriber line is reversed or the transponder is connected to the line in reverse polarity. Data will normally follow this diagnostic.

ANA2 is a response which would be received if (1) there is no transponder connected to the line accessed (wrong number, disconnected transponder); (2) incorrect interrogation signal transmitted; (3) telephone number not an active one; or (4) defective transponder. Data would not be received in this case.

Alert detector 112 generates signal 117 simultaneously with signal 116 which instructs line accessing system 101 to drop the connection and proceed to the next line. Signal 117 also initiates the data transfer cycle. Data transfer 118 transfers data contained in the supervisory memory 111 through interface 119 to the data recording section of 101.

Alert control 106 generates signal 120 at the beginning of the interrogation cycle. In the event that 101 is not instructed to drop the connection within the allotted time for a normal sequence by either abort signal 117 or signal 121 which occurs at the end of a normal data cycle, sequence timer 122 also generates signal 117 causing the connection to be dropped and signal 123 which is converted to a mnemonic "T" and stored in output memory 111. Data transferred to 101 would include the T and might be, for example, ACT or ANACT.

The data stream which is normally received by the present invention is fully described in U.S. patent application Ser. No. 565,974. Immediately following carrier detection by modem 109, binary coded data will be received via 105.

Signal 124 represents the demodulated data output of modem 109.

Signal 124 initiates a supervisory sequence in data process control 125 and alert control 106 intended to immediately release the connection, thereby restoring the subscriber line to normal service in the event he goes off hook (lifts his telephone receiver) during the data portion of the interrogation cycle.

"Off hook" detector 126 utilizes two methods to detect the occurrence. When an ordinary telephone receiver is lifted, the subscriber line pair is bridged by a relatively low resistance (i.e., 400 Ohms). On relatively short subscriber loops, the increase in line current will be detected by 106 causing signal 127.

On relatively long loops, the increase in line current may not be a reliably detectable condition since basic loop resistance would dampen the increase in current. The data signal would be severely attenuated by local bridging of the line by the off-hook telephone and with the additional attenuation of the longer loop signal level changes may cause the data stream to be interrupted. Data process control 125 includes circuitry to detect an interruption in the data and signal 128 actuates off-hook detector in this case.

When either signal 127 or 128 indicates the off-hook condition has occurred, off-hook detector 126 generates signal 117 which causes the connection to be aborted. 126 also generates a signal 129 which is converted to a mnemonic H by supervisory generator 110 and entered into supervisory memory 111. A data transfer cycle is also initiated by signal 117 so that supervisory data is transferred to line accessing system 101. A typical data word is "ACH", or "ANACH".

Data process control 125 passes data signals 124 directly to the input of buffer memory 130. As each bit is presented to the memory input, a clock pulse 131 which is derived from the transition point where the incoming data changes from the mid-band frequency to the data bit frequency is applied to the buffer memory 130 and data is serially moved into it. Data bits are counted by circuitry in the data process control 125 until a count of 22 is reached. At a count of 22, signal 132 enables parity detector 133.

At this point in the sequence, buffer memory 130 should contain a total of 22 bits. The first and twenty-second bits are framing bits (Binary 1). If either bit in memory position 1 or 22 is a binary 0, signal 134 combines with signal 132 in parity detector 133 to indicate that a parity error has been detected and produces signal 135. Signal 135 is converted to a mnemonic E by 110 and stored in 111.

When signal 132 occurs, signifying that a meter reading is stored in buffer memory 130, the data shift cycle is initiated by data process control 125. The data shift pulses 136 sequentially present each digit in parallel formal to comparator circuit 137.

As previously described, each digit is categorized and stored in comparator memory 138; verified and/or corrected in comparator 137 and ambiguity and bit correction 139 and shifted to the output memory 140, 141 or 142. Translation from 5 bit code to ASCII language occurs in comparator 137.

The first meter reading is shifted to output memory 140 during the 22nd bit interval of the incoming data stream 124. As data continues and the 43rd bit is received, the second meter reading is shifted to output memory 141. Data continues until the 64th bit is received and the third meter reading is shifted into 142.

Data process control 125 generates a signal 143 upon completion of the data shift cycles which causes data transfer 118 to instruct (signal 121) line accessing system 101 to release the connection to the subscriber line.

Data transfer 118 signals line accessing system 101 by means of signal 144 that data is available and all data contained in supervisory memory 111, and output memories 140, 141, 142 are transferred through interface 119 to storage such as a magnetic tape in the line accessing system 101.

IINTERROGATION SEQUENCE

Referring now to FIGS. 4A, 4B, 5, 6A and 6B, signal 103 triggers one-shot 401 to produce 402. Signal 402 actuates relay contacts 501 which close to discharge capacitor 502. Signal 402 is a pulse—typically 13 Ms long.

At the trailing edge of signal 402, one-shot 401 returns to its quiescent condition which triggers one-shot 403 to produce signals 404 and 405. Signal 404 turns on loop power supply 503 through operation of opto-isolator 505. Signal 405 triggers one-shots 406 and 407. 407 produces an output pulse 408, typically 75 Ms in length, which turns on alert power supply 506 through opto-isolator 507.

Signal 145 is supplied to the transcriber 100 at the time the subscriber line 105 is connected to 508 and signal 103 initiates the interrogation cycle.

For first exemplary purposes, assume that the subscriber line is a single-party line and therefore is equipped with a transponder designed to respond to a D.C. interrogation pulse. Signal 145 will, in this instance, inhibit one-shot 409 from responding to signal 405 and therefore alert power supply 506 will be pulsed on for the duration of signal 408.

The outputs of alert power supply 506 and loop power supply 503 are connected in series and fed through linear ramp generator circuit 504 and relay 509 contacts to the subscriber line connected at 508.

It should be noted that ringers connected to the subscriber line would respond to the interrogation pulse leading edge unless the pulse is shaped to regulate current flow through the ringer coils to a value low enough to prevent the condition commonly called "bell" tap.

Capacitor 502 is used in a "bootstrap" configuration to switch transistor 510 into construction in a linear ramp mode so that power is supplied to the subscriber line in a controlled shape manner to prevent bell tap.

The interrogation pulse applied to the subscriber line therefore is a D.C. pulse with a linearly increasing leading edge amplitude from zero to a voltage equal to the sum of the outputs of 503 and 506 where it stabilizes until the trailing edge of signal 408 where 506 is turned off. At this point, when 506 turns off, loop power supply 503 remains on under control of signal 404 and therefore continues to supply operating power to subscriber line.

For second exemplary purposes, assume that the subscriber line connected to 508 is a multi-party line equipped with a transponder which requires an alerting tone in addition to a D.C. pulse.

Signal 145 would not, in this case, inhibit 409 from responding to signal 405 and therefore the output 417 of 409 controls the length of 408 which typically would be 320 Ms. D.C. voltages applied to the multi-party subscriber line would be as described for the single-party line except that the length of the interrogation pulse is not typically 320 Ms instead of 75 Ms.

The subscriber line is connected to the output of tone transmitter 410 at 411 so that a selected tone is superimposed upon the D.C. interrogation pulse applied to the line at 508. Operation of the tone transmitter is as follows.

Piezo oscillator 412 furnishes an input signal to programmable divider 412 which is programmed by signal 145 to divide its input signal (typically 499.77 KHz) by factors of 33, 34, 35, 36, 37, 38, 39 or 40. The output signal of divider 413 is divided additionally by a factor of 24 by divider circuit 414 so that its output signal frequencies are 631.0, 612.4, 595.0, 578.4, 562.8, 548.0, 533.0 and 520.6.

Network 415 filters and shapes the square wave output of 414 to produce a semi-sinusoidal output of low harmonic content and applies it to the subscriber line at 411.

Signal 416 synchronizes the tone burst to coincide with signal 417. Normally, the transponder responds to the interrogation pulse and 410 returns to its quiescent condition at the trailing edge of signal 417.

A novel feature of the present invention, however, is the ability to recognize that the transponder failed to respond to interrogation and make a second attempt to interrogate the transponder.

Continuing maintenance on the outside plant portion of the switched telecommunications network, i.e., cable repairs and splicing, cable and pair reassignment, etc., often results in accidental polarity reversal of a subscriber pair. Where the subscriber service is an ordinary dial-type telephone—pulse dialing—the reversed pair does not affect service and therefore is undetected. If subscriber service is of the MF dialing type, his service may be affected. However, the usual solution for the problem is for the telephone repairman to reverse the connection of the telephone instrument to the line rather than actually reverse the pair polarity. As a result, a significant number of transponders could fail to respond to interrogation pulses of normal polarity since in the case of a reversed polarity pair, the polarity of the interrogation pulse as it arrives at the transponder would be incorrect.

Before continuing with the normal sequence, consider the response of the transcriber 100 to a failure to respond to interrogation by a transducer. Signal 103 triggers FLIP-FLOP 601 so that signal 602 switches low and starts timer 603. If the transponder responds to interrogation, carrier signal is received by modem 109, causing signal 108. Signal 108 resets FLIP-FLOP 601 and stops timer 603. If the transponder fails to respond, signal 108 does not occur and 601 completes its timing cycle and generates signal 604 which triggers one-shot 605. 605 generates a pulse 607 which triggers 608 on its trailing edge. Signal 609 pulses gate 610 which produces signal 611. Signal 611 triggers one-shot 412, producing signal 613.

Signal 413 is delayed for 30 Ms, typically to allow settling time for the subscriber pair. Signal 413 triggers one-shot 401 which once against discharges capacitor 502. Signal 413 also sets latch circuit 414, producing signal 415. Signal 415 actuates relay 509 contacts 511 which reverses the polarity of the connection of the subscriber line with respect to ramp generator circuit 504.

At the trailing edge of signal 402, a second interrogation sequence begins with the polarity of the pulse arriving at the transponder reversed.

If the transponder fails to respond to the second attempt, timer 603 times out and causes the connection to be dropped. Circuit action will be described in the supervisory signals section below.

Returning now to a normal transponder response, signal 103 sets FLIP-FLOP 612 which enables gate 613. Signal 108 subsequently occurs and causes gate 613 output 614 to switch high. Signal 614 high enables gates 615 and 616.

Data signls 124 control data latch circuit 617. A binary 1 bit produces signal 618 through operation of gate 615 which sets the latch and causes signal 619. A binary 0 signal produces signal 620 and resets the latch which produces signal 621.

Signal 619 is connected to the input of the buffer memory circuit 130 at 701. Signal 619 applies a binary 1 to the input of the bufer memory 30 when it is high or a binary 0 when it is low.

DATA ENTRY

After carrier signal 108 occurs and before the first data bit is received, signals 618 and 620 are both low, causing signal 622 to be high and 623 to be low.

The first data bit in the data stream 124 from the transponder is a framing bit which is always a binary 1. In response to this bit, the following circuit response occurs.

Signal 618 switches high, setting latch 617. Signal 619 therefore switches high, presenting the 1 bit to the input of the buffer memory 130 at 701. Signal 622 switches low, causing signal 623 to switch high. The described response occurs at the leading edge of the 1 bit pulse. No further circuit action occurs until the trailing edge of the bit.

The data stream from a transponder is of the return to zero type where the binary 1 condition is represented by a tone $F_s$, timing bits by a tone $F_c$ and the binary 0 bit by a tone $F_m$. Transitions from the binary 1 (0) to binary 0 (1) are always separated by a center frequency bit $F_c$ (timing) so that the demodulated data signal 124 characterisitcs are as follows:

| Binary | 624 | 625 |
|---|---|---|
| 1 | Hi | Lo |
| Inter-bit | Lo | Lo |
| 0 | Lo | Hi |

At the trailing edge of a data bit, therefore, 624 and 625 are both low, signal 622 switches high, and signal 623 switches low.

One-shot 626 is connected to respond to high to low transitions of signAL 623. At the trailing edge of each data bit, 626 is therefore triggered by signal 623 and generates a clock pulse 627. Clock pulse 627 is connected to the buffer memory at 702.

The bit presented to the input 701 of the buffer memory at the leading edge of the bit is therefore clocked into the memory at the trailing edge of the bit by signal 627.

Each incoming data bit is clocked into the buffer memory in the above described manner until a total of 22 bits have been processed. At this point in the data sequence, the first bit received is located in position 703 and the 22nd bit is located in position 704. Both bits are framing bits and are always binary 1's. The LSD of the meter reading is contained in positions 706, 707, 708, 709, 710 with the bit order A, B, C, D and E respectively. The other digits are stored in the remaining unnumbered bit positions between 704 and 706.

Signal 628, which is the complement of and occurs simultaneously with buffer memory clock signal 627, drives parity counter 629 which counts data bits. When 629 reaches a count of 22, signal 630 switches high. This occurs at the trailing edge of clock pulse 627 which shifted the 22nd data bit into position 703 of the memory. Signal 630 enables parity error one-shot 631. At this time, binary 1 framing bits should be positioned in both positions 703 and 704 so that signals 711 and 712 are both high.

Signal 711 and 712 are connected to NAND gate 632 inputs. If both 711 and 712 are high, signal 633 will be low at the time 631 is enabled by signal 630. Signal 634 will be low and 631 therefore is not triggered.

If, however, a parity error exists, either signal 711 or 712 will be low, causing 633 and 634 to be high. One-shot 631 will be triggered by signal 630 and generate a parity error signal 635. The effect of this signal is described later in the supervisory signals section.

Signal 630 also sets FLIP-FLOP 636. In the set condition, 636 switches 638 to the low condition which permits shift clock generator 639 to begin operation. In the set condition, 636 also switches 637 to the high condition which enables gate 640.

DATA PROCESSING

As shift clock generator 639 pulses gate 640 high, shift strobe counter 641 is clocked to sequentially pulse 642, 643, 644 and 645 high.

On the first clock pulse, 642 switches high. 642 is connected to the buffer memory output gates at 713. Signal 642 enables LSD output gates 714 so that the contents of buffer memory bit positions 706, 707, 708, 709 and 710 are presented at 715, 716, 717, 718 and 719, respectively.

On the second clock pulse, 643 switches high. 643 is connected to 720, and therefore gates 721 are enabled and present the contents of the five bit positions, representing the NMSD of the meter reading.

Data is therefore presented in a bit parallel—digit serial format at 715—719 as shift strobe 641 responds to clock pulses until four digits have been presented.

On the fifth clock pulse, 646 switches high. 646 switching high triggers one-shot 647 which resets FLIP-FLOP 636.

FLIP-FLOP 636 reset switches 637 low which inhibits its gate 640. Signal 638 switches high which stops 639. The data shift cycle is completed during the 22nd bit interval.

Incoming data continues and identical circuit action occurs at parity counts of 43 and 64 when the second and third meter readings are properly positioned in the buffer memory. Certain other circuit responses occur at a count of 64 which are described under data transfer.

Figure 8A:
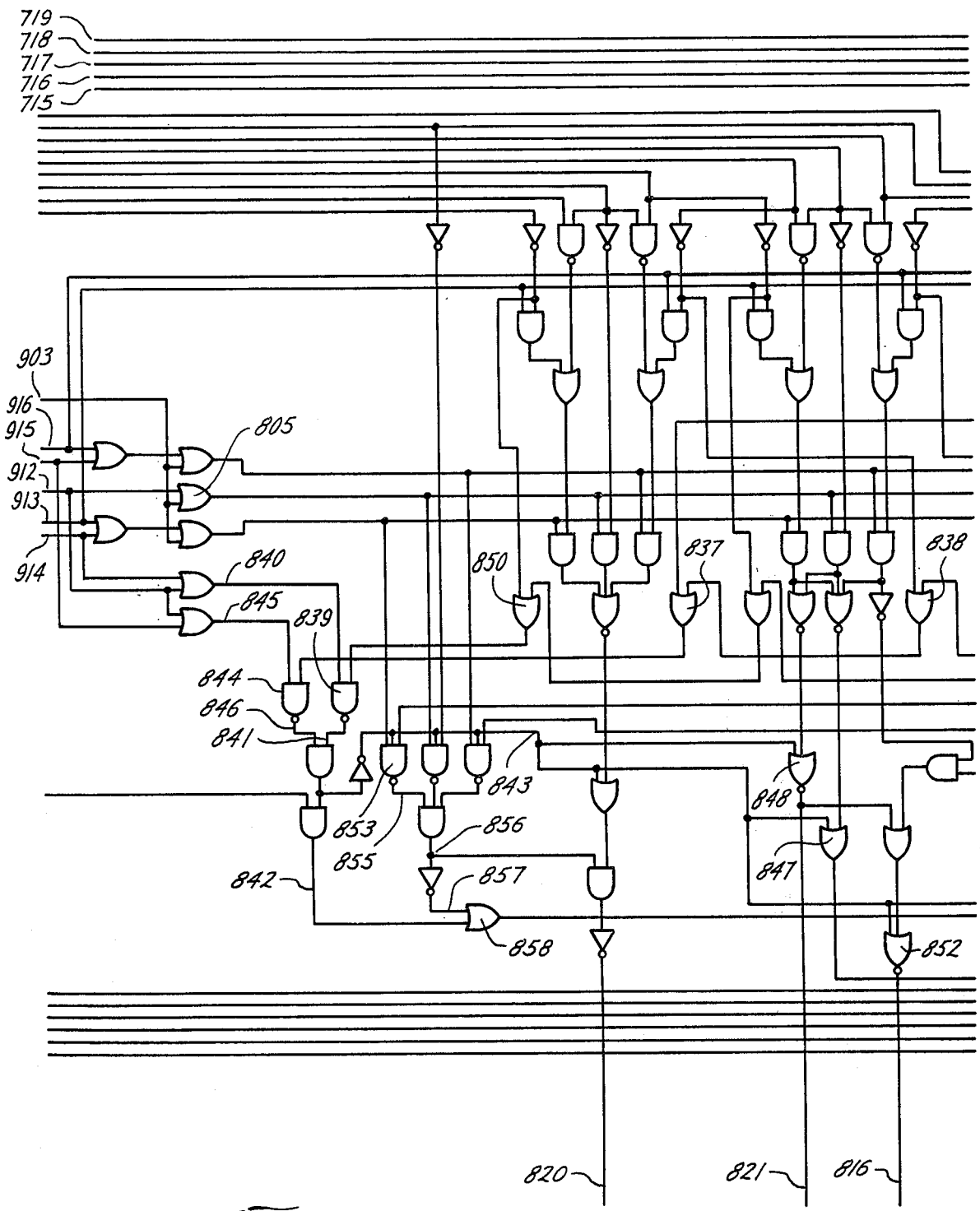
FIGS. 8A and 8B, 9A and 9B, taken together, are schematic diagrams of the comparator circuit.
Figure 8B:
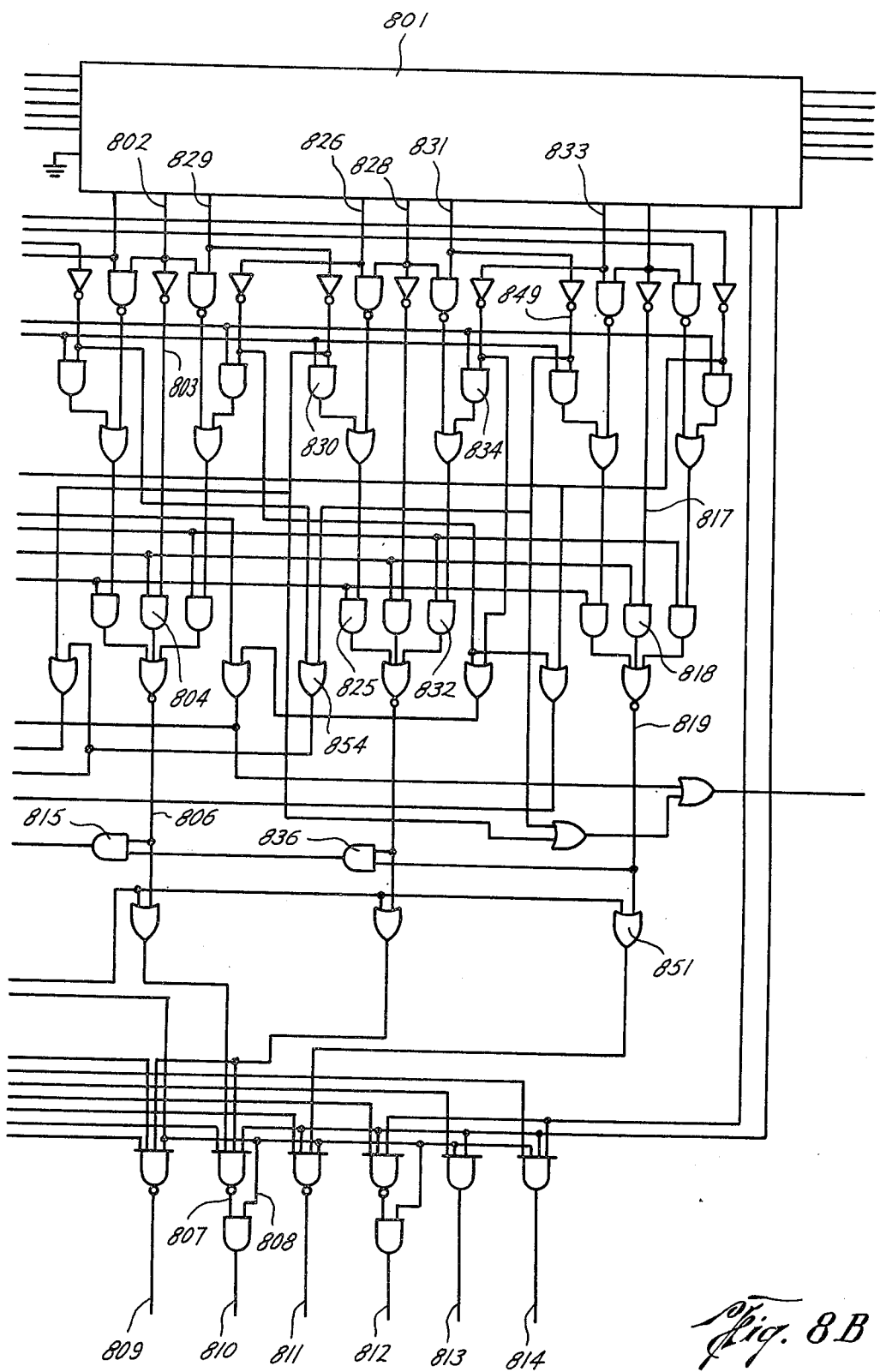
Figure 9A:
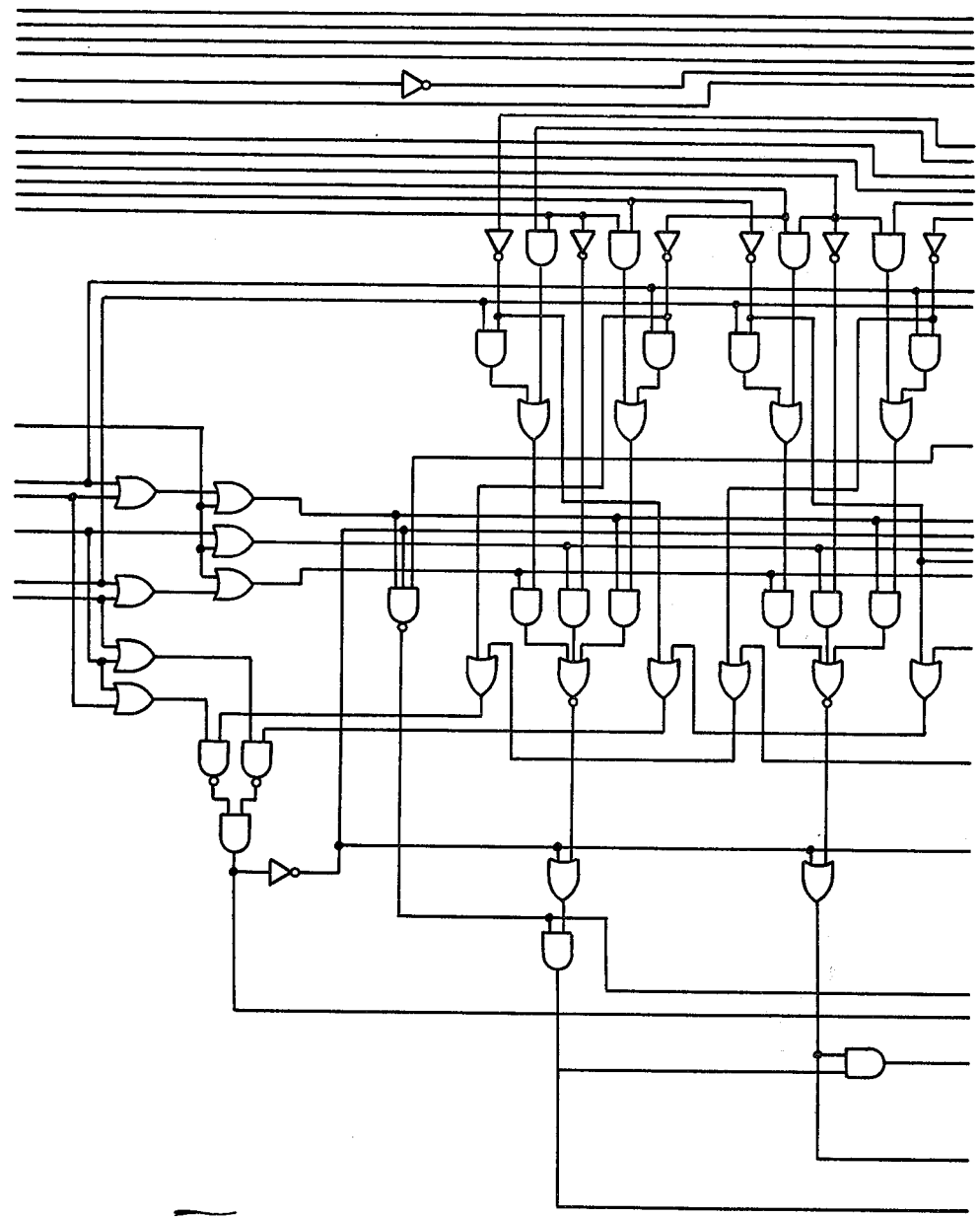
Figure 9B:
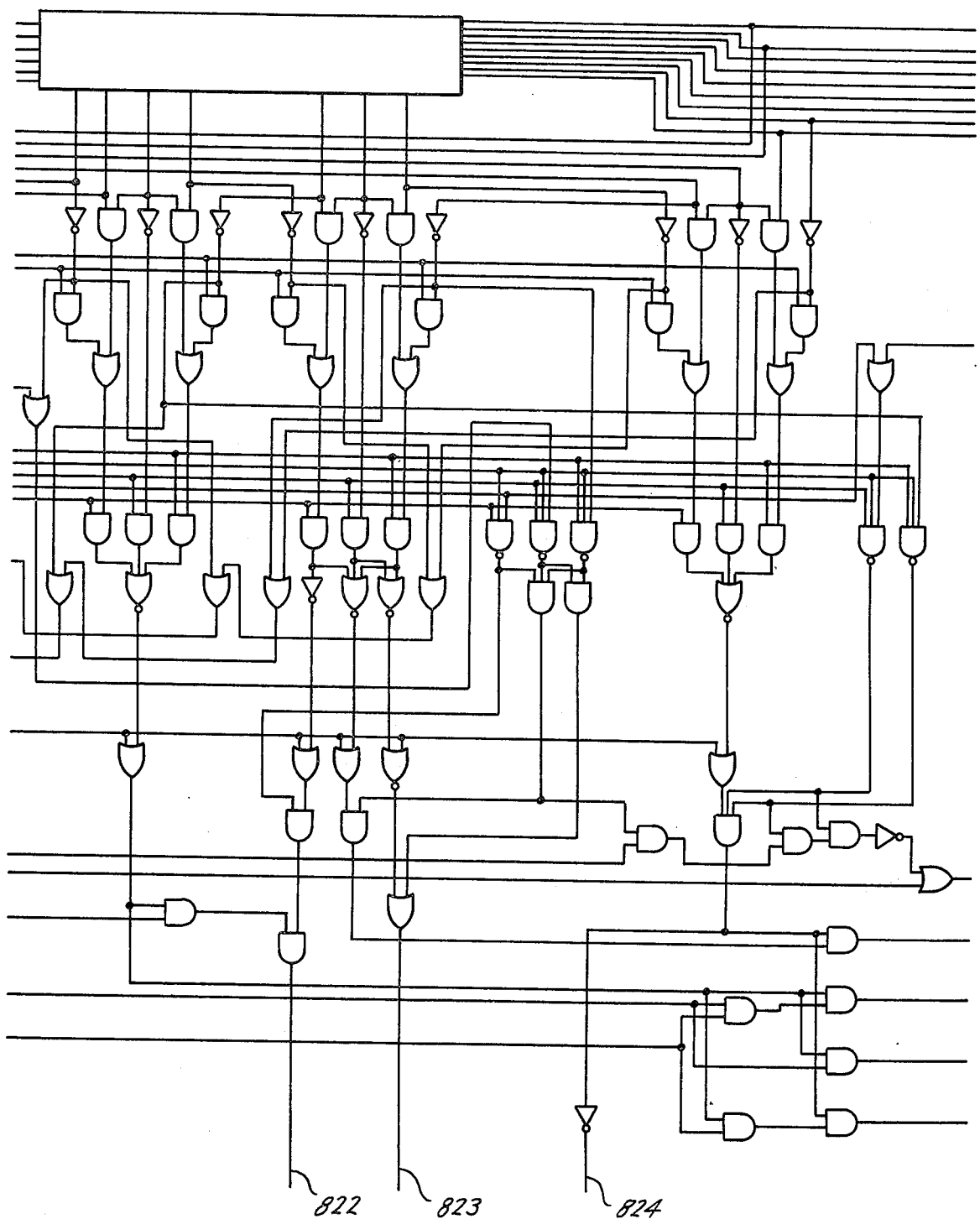

The data output leads 715–719 of the buffer memory are shown connected to a portion of the comparator circuit 137 in FIG. 8A.

801 is a decoding circuit which converts the 5 bit code into decimal format. For example, the code for the number 2 is 01000 and when applied to the input of 801 causes 802 to assume the low logic condition. 803 switches high and enables gate 804.

Assume that this is the LSD of a meter reading. Signal 642 causes the buffer memory to present the digit to the comparator. Signal 642 is also connected to comparator memory circuit 138 shown in FIGS. 10A and 10B and enables gates 901 and 902 to produce signal 903. Signal 903 is connected to 805 which furnishes the second input to gate 804.

Signal 803 therefore causes signal 806 to switch low. Signal 806 low causes 807 to switch high. 808 is high so that 810 switches high.

809–814 are the data output leads for the comparator circuit and under the described conditions are in the following state: 010011 which is the ASCII designation for the number 2.

Signal 806 causes gate 815 output to switch low and ultimately causes signal 816 to switch high. Signal 816 is connected to gate 904. The output 910 of gate 904 is connected to the input of latch circuits 905, 906 and 907.

Shift pulse signal 642 therefore causes the data signal 715 through 719 to be decoded, translated t ASCII language and presented at the output of the comparator circuits at 810 through 814 and categorized, which in our example results in signal 816.

Signal 642 also triggers one-shot 908 which enables latch circuit 905 to store signal 910.

As the data shift sequence progresses, signal 643 presents the NMSD digit to the comparator which functions as before. For example, assume that the number 4 is the NMSD. Signal 817 occurs and enables gate 818.

Signal 643 enables comparator memory circuit 911, causing signal 912. Since the LSD was 2 or in other words a number falling in the range 1" through 8', the input to 911 is signal 913 which results from signal 910 having been stored in 905.

Signal 912 is connected to gate 805 which enables the other input to gate 818. As a result, signal 819 occurs and is presented on leads 810 through 814 as 001011 or 4 in ASCII language.

Signal 816 occurs again since 4 also falls in the 1" through 8' range. Signal 643 also triggers 909 which enables 906 so that signal 910 is stored in 906.

Decoding of any digit is implemented by circuitry similar to that described for our exemplary numbers 2 and 4. As any number is decoded, it is categorized in the same manner as above to produce signal:

820 for A O
821 for 1' or 1
816 for 1" through 4"
822 for 5' through 8'
823 for 8 or 8"
824 for 9

Figure 10:
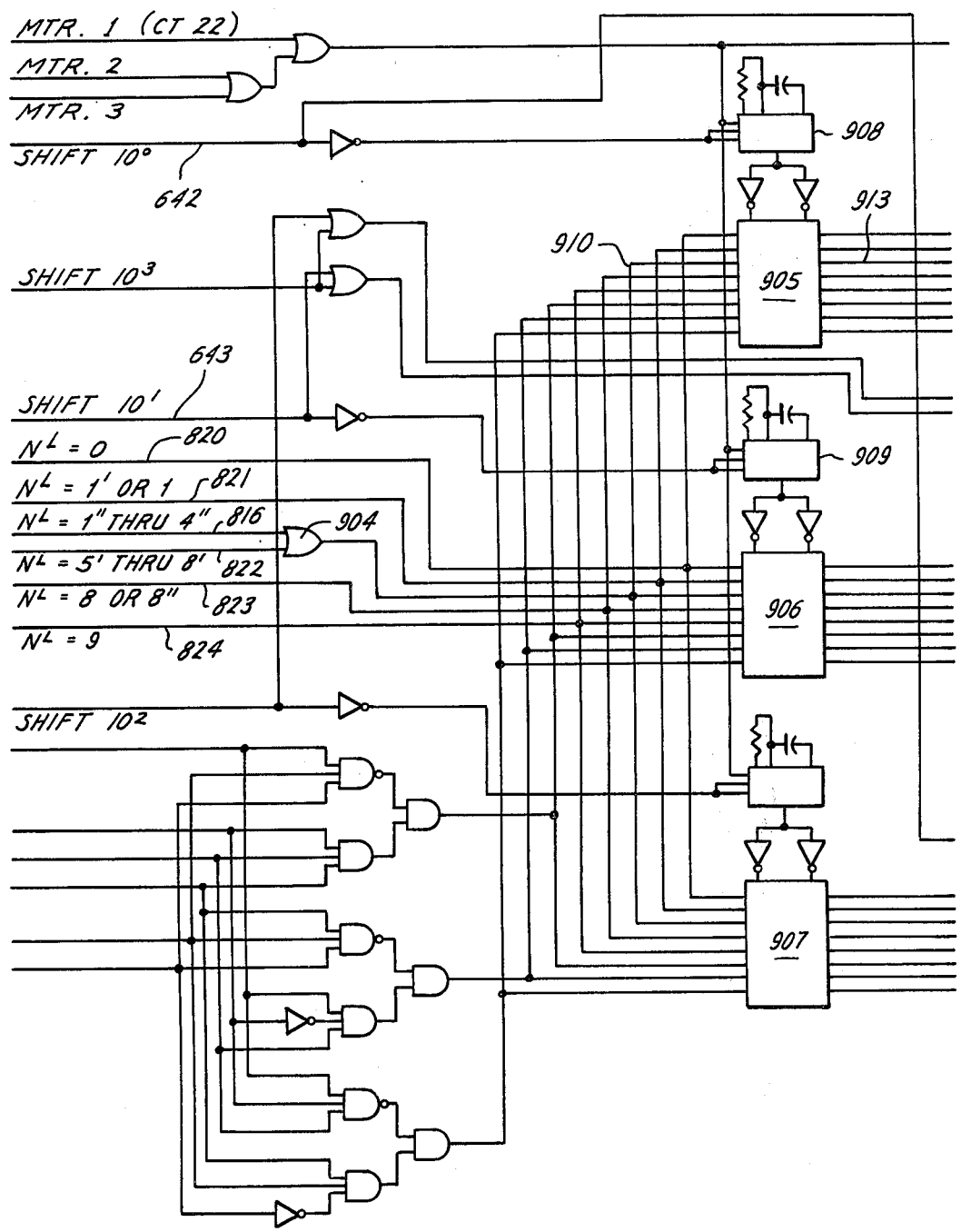
FIGS. 10A and 10B taken together are a schematic diagram of the comparator memory circuit.
Figure 10B:
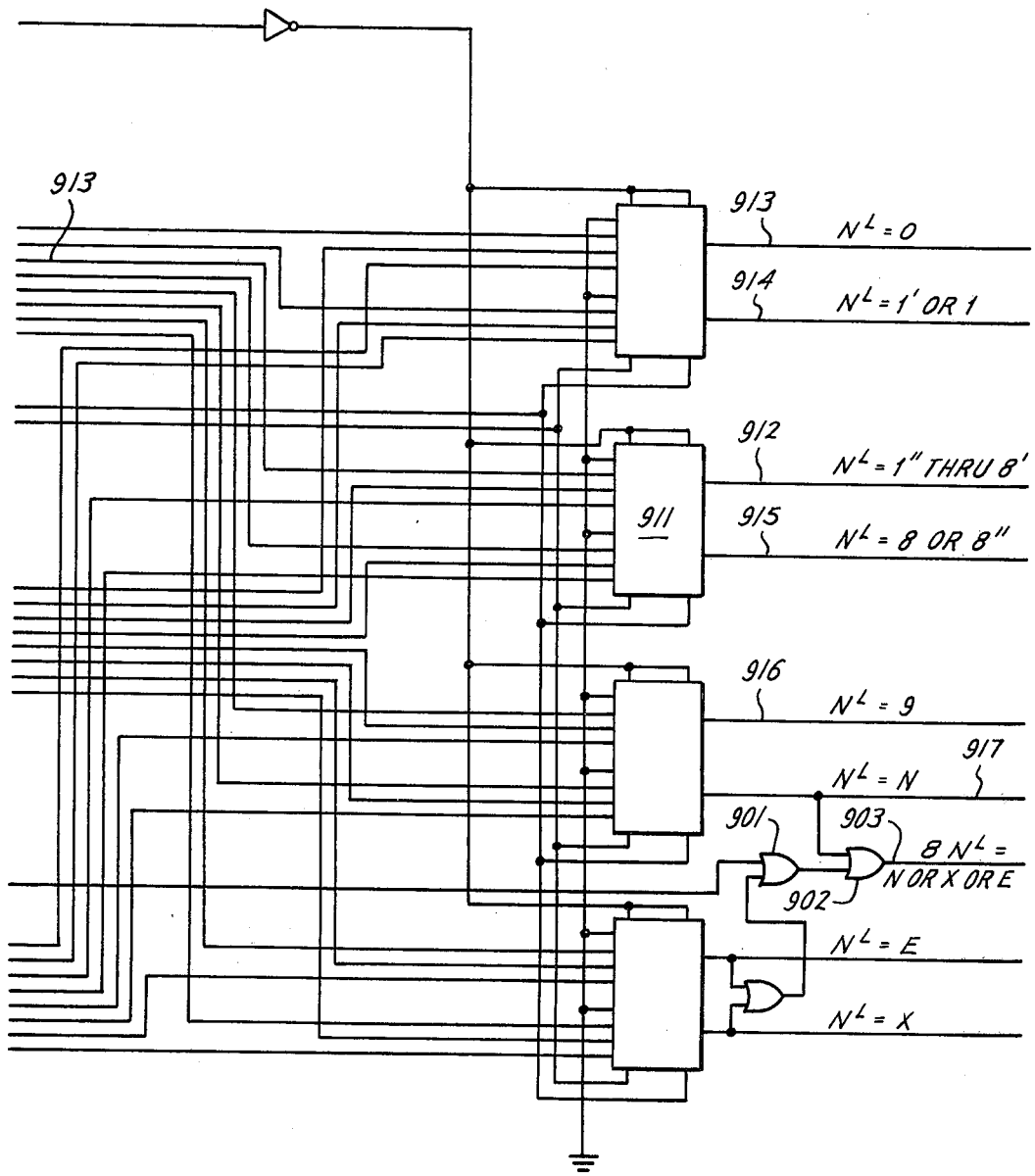

These signals are connected to the comparator memory as shown in FIGS. 10A and 10B.

Signals 642 through 645 enable circuits such as 911 and produce the signals:

913 for 0
914 for 1' or 1
912 for 1" through 8'
915 for 8 or 8"
916 for 9

Signals 913 through 916 are connected to the comparator circuit as shown in FIG. 8A.

Certain corrective actions, applied to the meter readings as they are processed, are implemented through the use of signals 912 through 916. These were described in U.S. Pat. No. 3,686,368; however, the present invention represents an improvement and extension of the principles therein described.

Three types of corrections are made by the circuitry in the comparator.

The first type to be considered is where the LSD is a 0. With LSD=0, NMSD must be N', for example 3'. Referring to FIG. 8A, note that signal 913 enables gate 825 and signal 826 (3') is fed to the output. If, however, encoder contacts are leading their true position, the number 3 would be received and signal 828 is in effect changed to 3' and passed to the output. If encoder contacts are lagging their true position 2", signal 829 is the digit which would be received. Gate 830 is enabled by signal 913 which routes signal 829 to gate 825, effectively correcting the 2" to 3'.

The second type to be considered is where the LSD is a 9. When LSD is 9, NMSD must be N", for example 3" signal 831. Signal 903 enables gate 832 so that signal 831 is routed to the output. If the encoder contacts are leading the true position a 4', signal 833 would be received and enables gate 834. Signal 903 is the other input to gate 834 and its output is fed through gate 832 to the output so that the 4' has been corrected to 3". If the encoder contacts are lagging a 3, signal 828 would be received and fed through gate 832 to the output.

Note that in either type of correction, the corrected digit generated signal 816 through gates such as 815 or 836.

The third type of corrective process relates to permutations of the binary code for a digit occurring as a result of encoder contact malfunctions or transmission path errors. This novel feature has been described generally earlier in the disclosure.

When the decoded $N^{msd}$ digit in the comparison is of the N' type (for example 1') OR gates such as 837 or 838 enable 844. If $N^{lsd}$ in the comparison was a number between 1" and 8', signal 912 produces signal 845 which causes 846 to switch low. Signal 846 low causes signal 842 to switch low, signifying that an unacceptable error in comparison has been detected.

Signal 846 causes signal 843 to switch high. Signal 843 high performs three functions:

1. Inhibits or gates such as 847 in digit line from applying the erroneous digit to the output.

1. Inhibits categorizing gates such as 848 to prevent the digits character (N', N or N") from being stored in the comparator memory.

3. Enables hardwired logic circuits which correct the erroneous digit in accordance with FIG. 3.

In the instant example, the error cannot be resolved and therefore signal 842 is routed to the outputs as an ASCII E or, in other words, signals 809 through 814 become 101000. The E is stored in the output memory in lieu of the erroneous digit as part of the meter reading.

In order to illustrate details of the corrective action, assume that the circuitry is engaged in a comparison where $N^{msd}=3"$ and $N^{lsd}=1'$. Signal 849 switches high and enables 839 through gates such as 850. Signal 914 is high; therefore, 840 is high and 841 is low. Signal 841 low causes signal 842 to be low, signifying that an error has been detected. Signal 843 is high and prevents 851 from passing the $N^{msd}$ digit (3") to the output. Signal 843 inhibits gate 852 so that the erroneous digit is not categorized and stored in the comparator memory. Signal 843 enables gates such as 853 which serve the purpose of substituting the correct number for the erroneous one. In the instant example, signal 914 enables one input to gate 843, signal 843 enables the second input and signal 849 enables the third input through gate 854. Signal 855, therefore, switches low. Signal 855 low causes signal 856 to switch low, producing signal 820 which is stored in the comparator memory indicating that a 0 has been decoded.

Signal 856 low produces signal 857 high which inhibits 858 from applying signal 842 to the output so that 809 through 814 assume the 000011 condition and a 0 is stored in the output memory.

DATA STORAGE

Figure 12A:
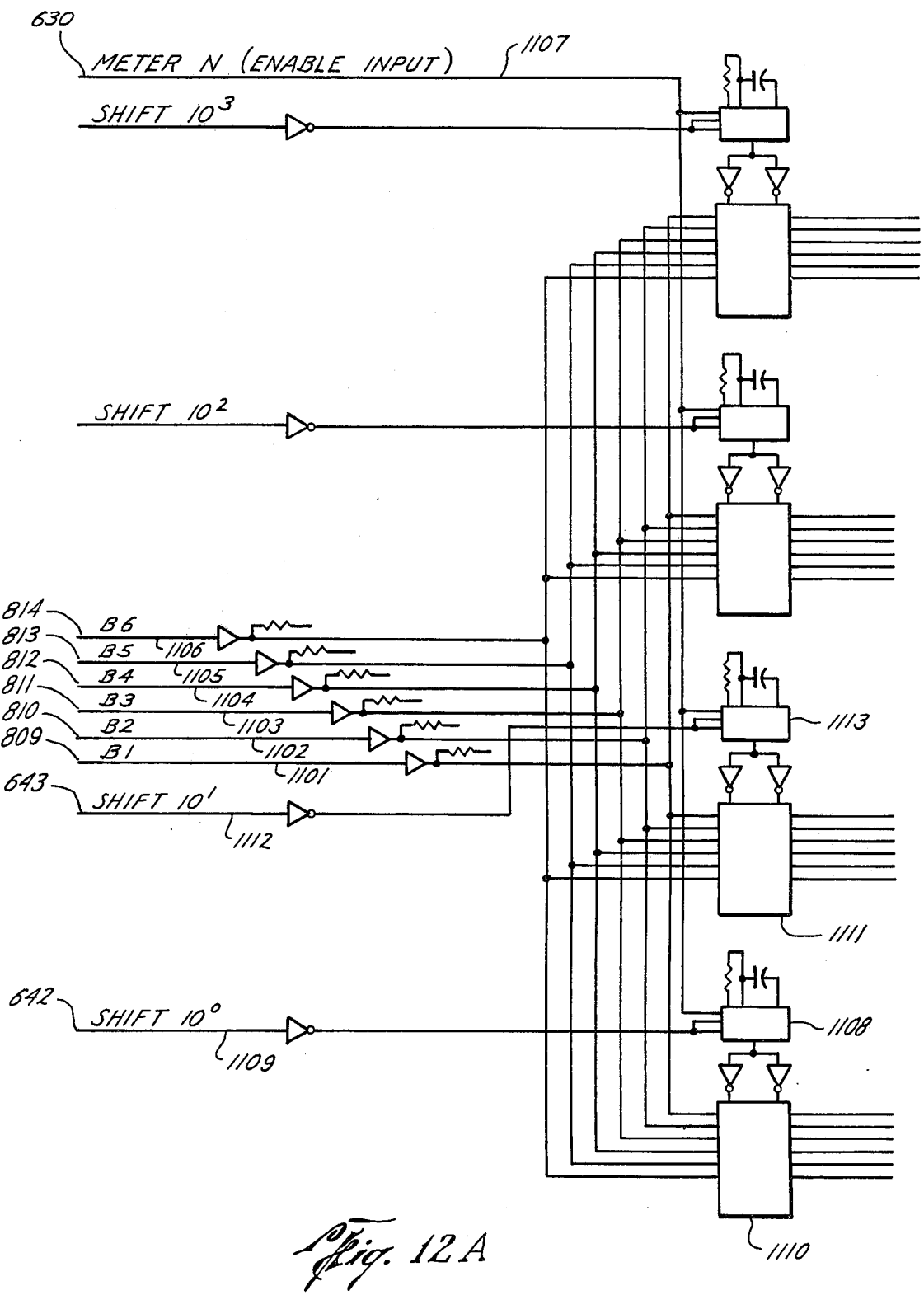
FIGS. 12A and 12B taken together are the schematic diagram of an output memory circuit.
Figure 12B:
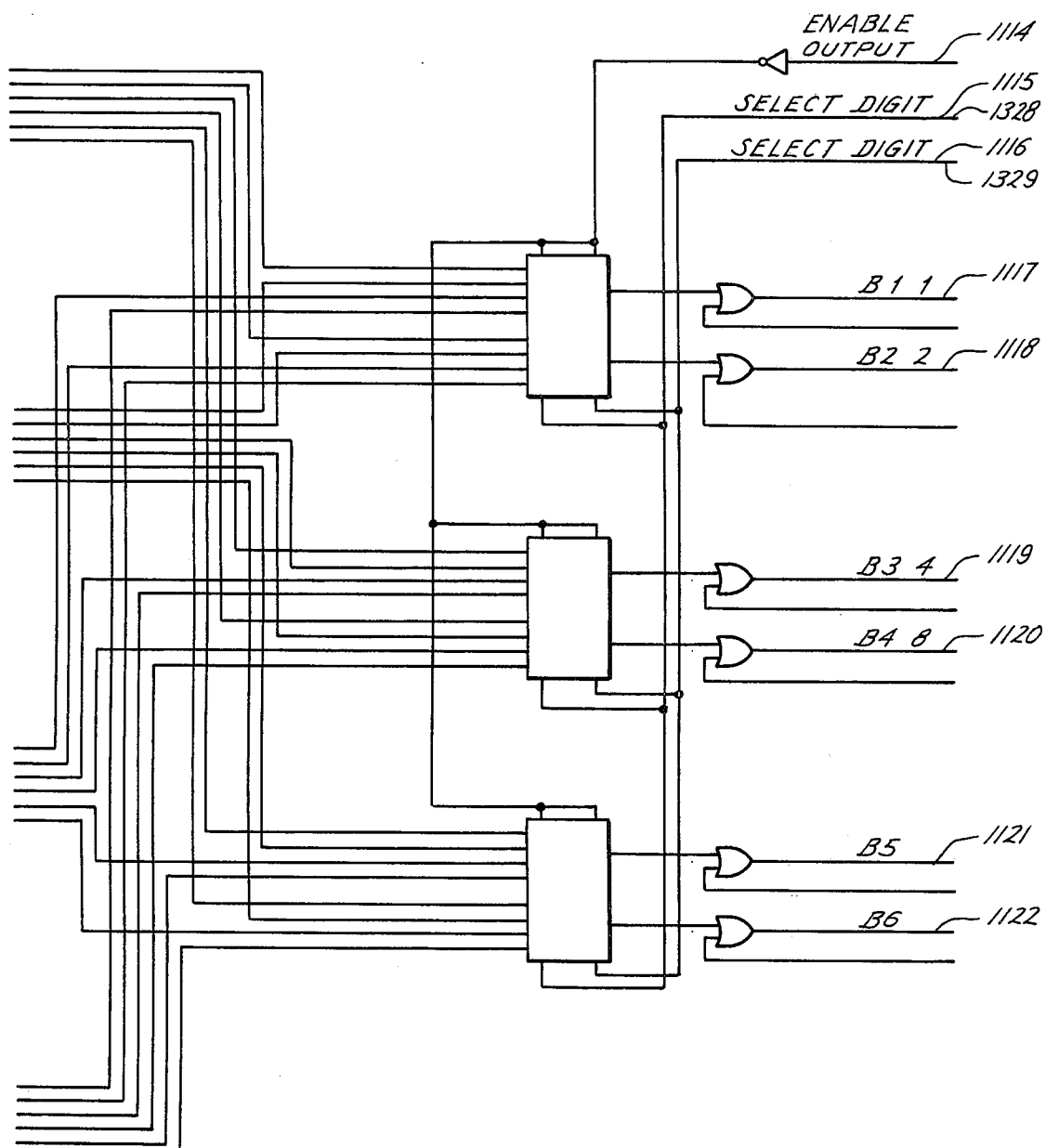

FIGS. 12A and 12B illustrate a typical output memory circuit. An output memory is used to store each meter reading as it is decoded.

The inputs of each of the output memories 1101, 1102, 1103, 1104, 1105 and 1106 are connected to a data buss which is connected to 809, 810, 811, 812, 813 and 814.

As each digit is applied to the buss during data processing, one of the memories is enabled by signals such as 630 which is connected to 1107. 1107 is the enabling connection to one-shot circuits such as 1108.

Signals such as 642 cause a digit to be decoded, corrected by the comparator and applied to the input of the output memories. Signal 630 enables the correct memory while signal 642 triggers a one-shot circuit such as 1108. The output of 1108 enables a hex-latch circuit such as 1110 which stores the digit.

Signal 642 is followed by signal 643 which triggers one-shot 1113 and causes the next digit to be stored in latch circuit 1111, etc., until all four digits have been stored.

SUPERVISORY SIGNALS

Figure 13:
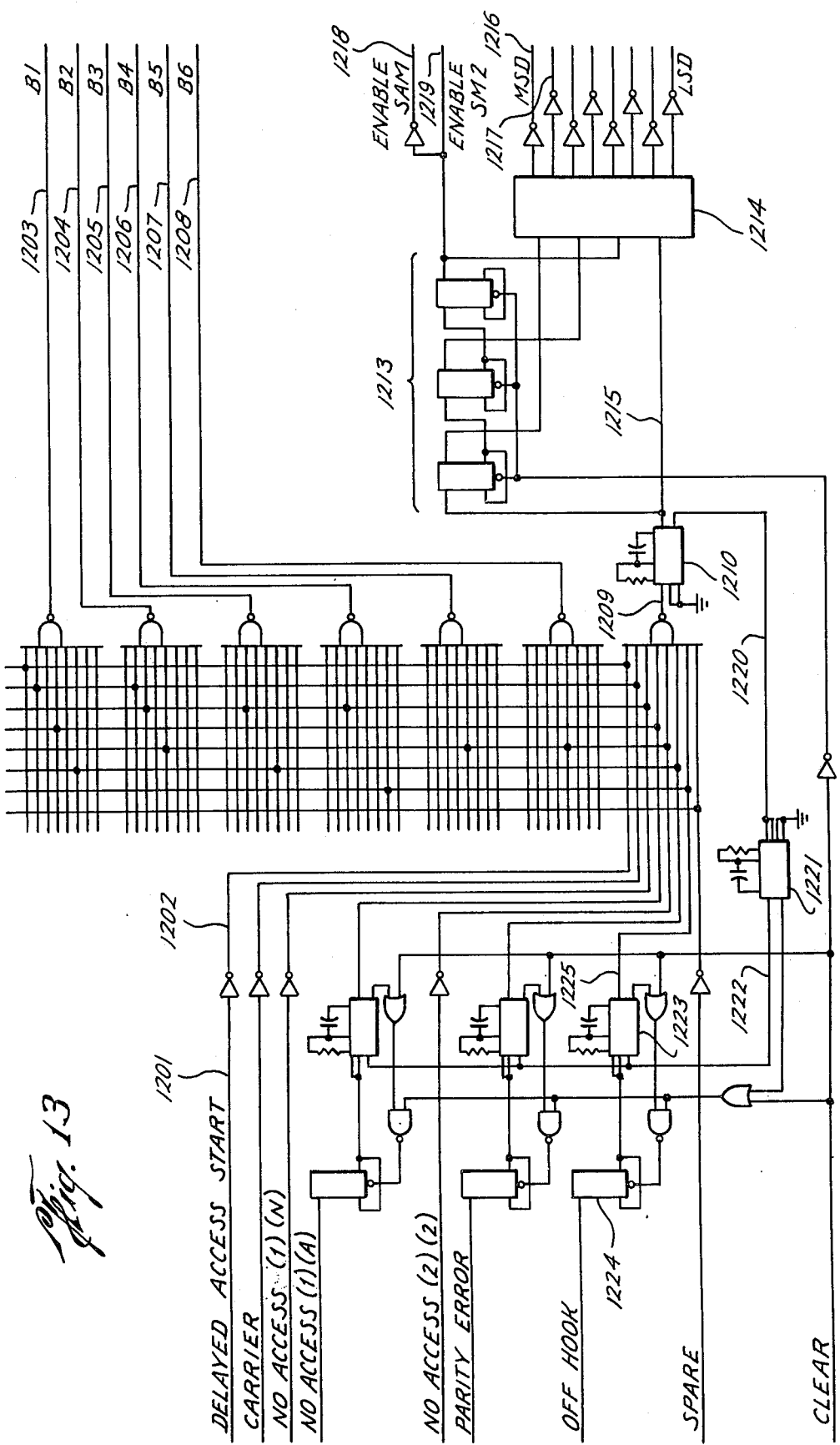
FIG. 13 is the schematic diagram of the supervisory mnemonic generator circuit.

FIG. 13 illustrates the circuits used to encode various supervisory signals into ASCII format and control sequential storage of each character in the supervisory output memory.

The first signal to occur is signal 103 which is connected to 1201. Signal 103 occurs at the beginning of the interrogation sequence and causes 1202 to switch low.

The supervisory generator output buss 1203–1208 is normally in the low state or 000000 condition. Signal 1202 switching low causes 1203 to switch high so that the output buss assumes the 100000 condition representing the A character in ASCII language.

Signal 1202 also produces 1209 which triggers one-shot circuit 1210.

Counter circuit 1213 is at this time at zero. When signal 1215 is pulsed as a result of 1210 triggering the zero output 1216 of 1214 pulses and causes the character present on the output leads 1203–1208 to be stored in the supervisory output memory. Signal 1215 also advances counter 1213 to a count of 1.

When the next supervisory character occurs, the digit is again presented on the output leads. 1210 triggers and signal 1215 enables 1214 which produces a signal 1217, causing the second character to be stored in memory.

The supervisory output memory consists of two circuits identical to the data output memory shown in FIGS. 12A and 12B.

Signal 1218 enables the first memory until four supervisory characters have been stored. If four characters have occurred, counter 1213 will be at a count of 4, and signal 1219 occurs to enable the second memory and inhibit the first memory. Subsequent characters will be stored in the second memory.

It is possible for certain of the supervisory signals to occur at the same time, for example, a subscriber going off hook might cause a parity error so that signals 129 and 635 may occur at or near the same time. Since the data buss is serially oriented, it must be allowed to transfer the supervisory character to memory before another character is applied to it or a meaningless character may result.

Signal 1220, which is the complement of signal 1215, is employed to trigger one-shot 1221. The output 1222 of 1221 inhibits one-shots such as 1223 to prevent their response to input signals while a character is being transferred to memory.

For example, if the output buss contained a character such as E resulting from signal 635 and signal 129 occurred, FLIP-FLOP 1224 would store signal 129.

When the E character has been transferred and signal 1222 returns to normal, one-shot 1223 is enabled and is triggered by 1224 producing signal 1225. Signal 1225 causes 1203–1208 to assume the 000100 condition which is the ASCII code for H. The effect of signal 1220 is therefore to delay the H character until the buss is clear.

DATA TRANSFER

The foregoing descriptions were organized to describe in a general manner an interrogation sequence to the point where supervisory and/or meter reading data has been received and stored in the various transceiver output memory circuits.

The data transfer sequence, which is the final function of the transceiver during an interrogation sequence will now be described.

The data transfer sequence occurs at one of the following points in the sequence:

1. When two attempts have been made to activate the subscriber end equipment and both have failed; or
2. When an off-hook condition has been detected;
3. When the 64th data bit has been received (fourth framing bit) signifying that data transmission has been completed; or
4. When timer 122 times out, indicating that sufficient time has elapsed for data transmission to be complete although the 64th bit has not been counted.

Figure 14:
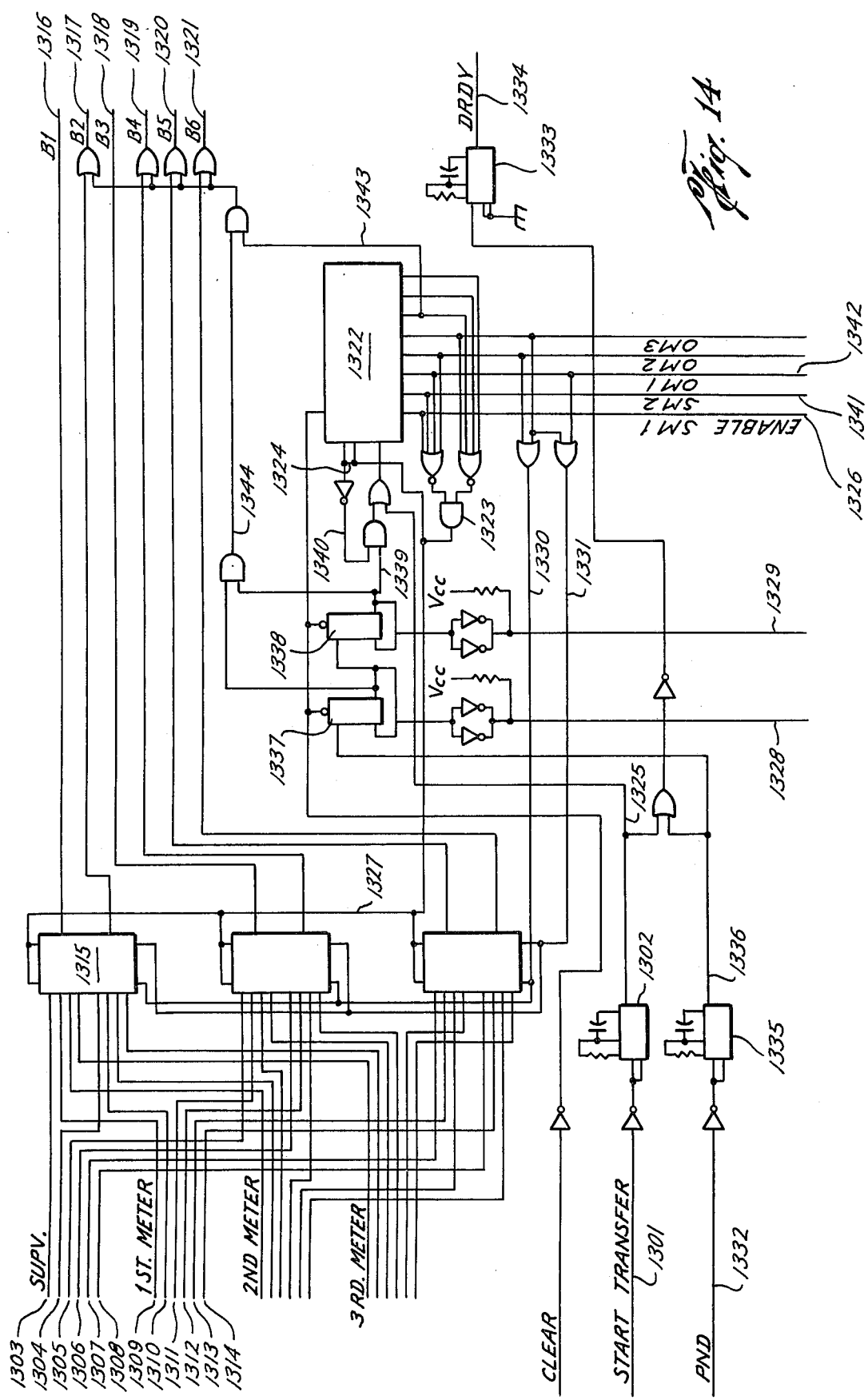
FIG. 14 is the schematic diagram of the data transfer circuitry.

The data transfer sequence is initiated by signal 143 which is connected to 1301 FIG. 14. Signal 143 is a summing point signal produced by signals 129, 648, 649 or 420. Signal 143 triggers one-shot 1302.

The outputs of the two supervisory output memories are bussed and connected to 1303–1308.

The output of each data output memory is connected to leads such as 1309–1314. Multiplexer circuits such as 1315 sequentially route data from each output memory to the data transfer buss leads 1316–1321.

Figure 11:
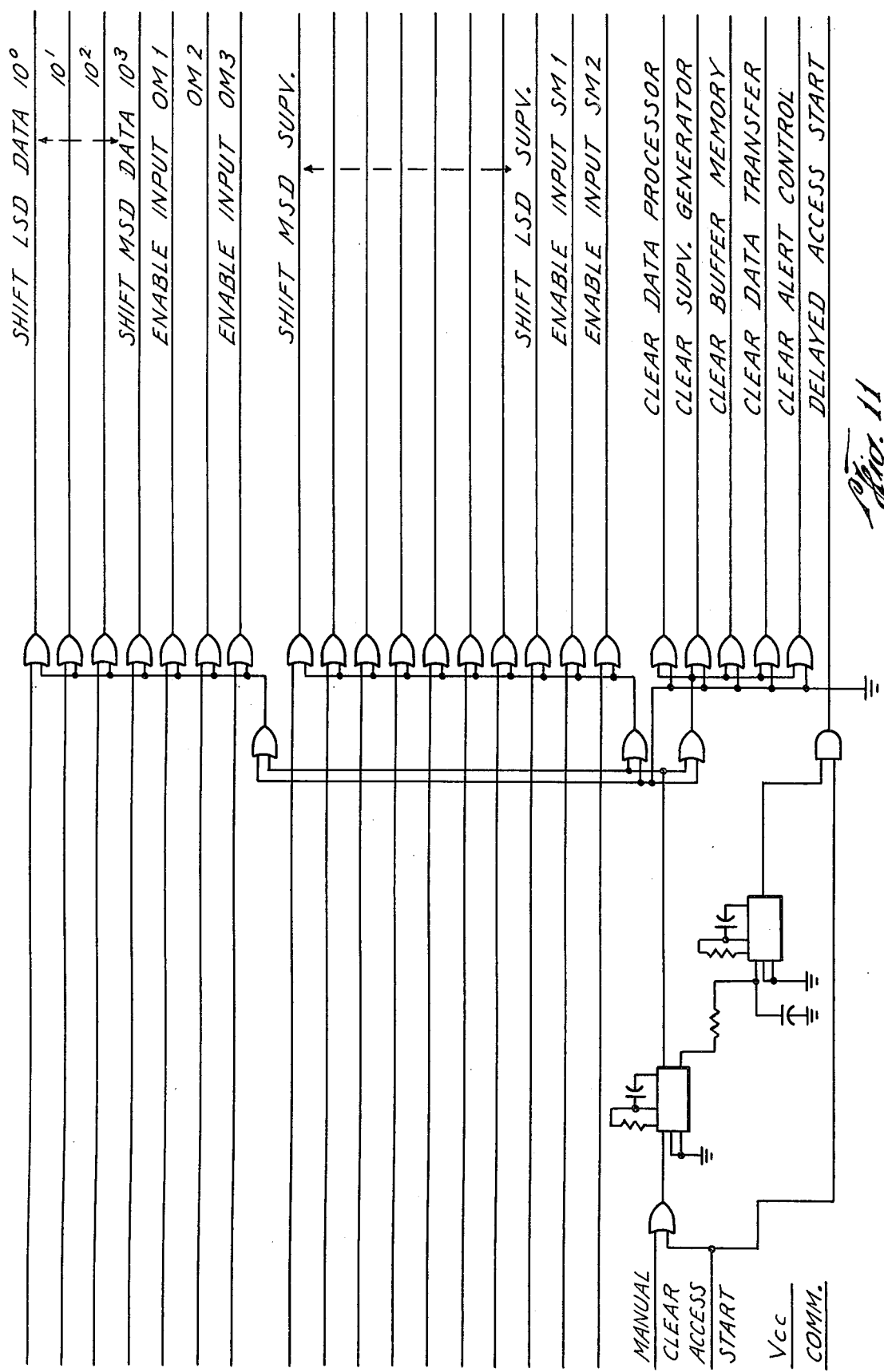
FIG. 11 is the schematic diagram of the transceiver reset circuitry.

Multiplexer circuits are controlled by shift-register 1322 which also enables the output circuits of output memories as shown in FIG. 11.

Operation of the circuit is as follows:

Shift register 1322 is initially at zero count (contains all zeros). Gate 1323 holds the input 1324 of 1322 in the "one" condition.

One-shot 1302 is triggered by signal 143 to start the data transfer sequence. Signal 1325 clock the one at the input into shift-register 1322 in the first bit position. Signal 1326 is the output of the first bit position and switches high. Signal 1326 is connected to the output enables lead of a supervisory memory circuit such as shown in FIG. 11 at 1114.

Signal 1326 switching high causes the output 1327 of gate 1323 to switch low, thus returning the input of 1322 to the "zero" condition so that subsequent clock pulses to 1322 will circulate the one presently in the first bit position through the register to sequentially enable each of the output memory output circuits.

Signal 1327 low also enables multiplexers such as 1315.

Signals 1328 and 1329 are both low or in the "00" condition and serve to address the multiplexers in the output memories through connections such as 1115 and 1116.

With an output memory enabled by signal 1326 and addressed by signal 1328 and 1329 00 the first digit to be transferred is presented on its output leads 1117–1122 which are connected to leads such as 1303–1308 of the data transfer circuit.

Signals 1330 and 1331 address the multiplexers 1315 of the data transfer circuit and are in the 00 condition at the beginning of the sequence so that signals on inputs 1303–1308 are presented on output leads 1316–1321.

It is important to note that signal 1325 caused shift register 1322 to produce signal 1326 which resulted in the first digit being applied to the output leads. Subsequent digits are the result of signal 1332.

Signal 1325 also triggers 1333 to produce data ready signal 1334. Each time a digit is presented on the output leads, signal 1334 indicates its presence, causing line accessing system 101 to store the digit on magnetic tape for example and transmit a present next digit signal 1332.

Signal 1332 triggers 1335 to produce signal 1336. Signal 1336 switches FLIP-FLOP 1337, causing 1328 to assume the "1" condition so that 1328–1329 now present "10" to the output memory multiplexers, causing the second digit to appear — ultimately on 1316–1321. Signal 1336 also triggers 1333 as 1325 did on the first digit.

Signal 1332 causes 1337 to switch which switches 1338 so that 1328 and 1329 now address the third digit in the output memory by assuming the "01" condition. Signal 1334 causes it to be transferred and signal 1332 is received again producing signal 1336.

FLIP-FLOP 1337 switches and 1328–1329 are in the "11" condition which selects the fourth digit to be transferred.

At this point in the sequence, signal 1339 is low and signal 1340 is high. When signal 1332 occurs for the fourth time (requesting the fifth digit) both FLIP- FLOPS 1337 and 1338 switch to the 0 condition. Signal 1339 therefore switches high and clocks shift-register 1332, moving the bit which has been in the first position of the register to the second position, causing signal 1326 to assume the low condition and producing signal 1341. Signal 1341 high enables the second output memory and since 1328 and 1329 are in the 00 state, the first digit of the second memory appears on leads 1316–1321.

The above-described action continues until the ninth digit is called for and signal 1342 is produced.

Signal 1342 causes 1331 to switches high so that multiplexers 1315 receive a 10 address, causing signals present on inputs 1309–1314 to appear on the output leads 1316–1321.

From the foregoing explanation, it should be obvious that signal 143 initiates the data transfer sequence by placing a 1 in shift register 1322. The sequence is maintained thereafter through an interchange of data signals, signal 1334 and 1332 betwen the transceiver and the line accessing system. Shift register 1322 sequentially selects the output memory from which data is to be transferred and signals 1328 and 1329 sequentially select the digit to be transferred.

When a total of 20 digits have been transferred, 1322 advances the bit contained in it to the next position, causing signal 1343. Counters 1337 and 1338 are both in the 0 condition so that signal 1344 is produced.

Signals 1343 and 1344 produce signal 1345 which causes 1316–1321 to assume the 010111 state representing the semicolon character in ASCII format.

The line accessing system is programmed to recognize the semicolon as an end of data signal and discontinues generating signal 1332 thus ending the data transfer sequence.

This completes the description of the interrogation sequence. The entire sequence is repeated on the next subscriber line to be interrogated. The reset circuit of FIG. 11 is connected to various of the other components previously described and perform the function of assuring readiness of the various circuits to receive meter readings.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts may be provided, without departing from the spirit of the invention and the scope of the appended claims.

What is claimed is:

1. A data transceiver for transmitting interrogating signals to sequentially activate and poll a plurality of data transponders connected to a common telephone communication path and receiving and processing data from an activated transponder transmitting data, comprising, an input having means to transmit interrogating signals and operating power for the transponders through the communication path, temporary storage means connected to the input means to store the received data from the transponders, parity means connected to the temporary storage means to check parity of the received data, a comparator and a comparator memory connected to the temporary storage means for correcting ambiguities in the position of the errors in the received data, an output memory receiving the corrected data from the comparator, a data control connected to the input for controlling the data processing, means connected to the input to detect when a telephone connected to the path is activated by lifting its receiver "off hook" while signals and data are being transmitted, a supervisory information character generator connected to the input for providing identifying data corresponding to various operating conditions occurring in the operating sequence of said transceiver, a supervisory output memory connected to the supervisory character generator to store the identifying data, a common data output for receiving data from said output memories, and a data transfer circuit to multiplex the outputs of the output memories to the common data output.

2. The apparatus of claim 1 wherein the temporary storage means is a serially connected plurality of FLIP-FLOP circuits for receiving the data and includes gated control of the FLIP-FLOP outputs actuated by the data control.

3. The apparatus of claim 2 wherein framing bits precede and follow each data work from the transponders and are stored in FLIP-FLOPS having continuous output to the parity means.

4. The apparatus of claim 3 wherein the parity means determines the binary condition of the framing bits in the temporary storage.

5. The apparatus of claim 1 wherein data from the transponders include timing bits and the parity means and temporary storage means avoid counting and storing the timing bits.

6. The apparatus of claim 1 wherein the interrogating signals consist of a DC pulse or a DC pulse with an audio tone superimposed upon it.

7. The apparatus of claim 1 wherein the amplitude of both the interrogation signals and the operating power are of an amplitude sufficient to cause the transponder to consume enough current to overcome the effect of any bridge lifters in series with the telephone line.

8. The apparatus of claim 1 including a timer connected to the input for determining whether or not a transponder has responded to a first interrogation pulse.

9. The apparatus of claim 8 wherein the timer causes a second interrogation pulse of opposite polarity to be transmitted if the transponder fails to respond to the first interrogation pulse.

10. The apparatus of claim 1 wherein the comparator and comparator memory generate a signal causing a mnemonic to be stored in the output memory in place of a digit determined to be erroneous but which cannot be resolved.

11. The apparatus of claim 1 wherein the data control generates a signal causing an identifying mnemonic to be stored in the supervisory output memory when either an interrogating signal is transmitted, carrier is received, each time a transponder fails to respond to interrogation, when a parity error is detected, when an off-hook condition occurs, or when the allotted time for an interrogation cycle has expired but the sequence has not been completed.

12. The apparatus of claim 1 wherein the comparator generates a signal causing a mnemonic to be substituted for a missing digit in the data stream and stored in the output memory in place of it.

13. The apparatus of claim 1 wherein the data transfer circuit transfers a space in lieu of a zero where a legitimate zero does not appear on its output leads and some other character is not present.

14. The apparatus of claim 1 wherein data in transferred from the output memories to the common data output by a digit serial transfer in response to timing signals from the common data output which insures synchronism between the common data output and the transceiver.

15. The apparatus of claim 1 wherein a second failure to alert signal, an off-hook signal, and end-of-data, or a sequence, failure signal to the supervisory generator produces an abort signal which causes the interrogating signals to be stopped and the connection to a subscriber line to be released.

* * * * *

UNITED STATES PATENT OFFICE
CERTIFICATE OF CORRECTION

Patent No. 4,002,837      Dated January 11, 1977

Inventor(s) Theran L. Ebner et al.      Page 1 of 2

It is certified that error appears in the above-identified patent and that said Letters Patent are hereby corrected as shown below:

Column 3, line 8, change "part" to --port--
Column 3, line 64, change "te" to --the--
Column 4, line 7, after the second occurence of "0" change the period to a --,--
Column 4, line 63, change "in" to --is--
Column 4, line 68, change $N^{mds}$" to -- $N^{msd}$"--
Column 5, line 4, change $N^{mds}$" to -- $N^{msd}$"--
Column 5, line 14, change "comprison" to --comparison--
Column 5, line 46, change "number" to --numeral--
Column 6, line 9, change "connect" to --connected--
Column 8, line 29, after "produce" insert --signal--
Column 8, line 62, change "construction" to --conduction--
Column 9, line 16, change "not" to --now--
Column 9, line 23, change "412" to --413--
Column 10, line 32, change "bufer" to --buffer--
Column 10, line 56, change "characterisitcs" to --characteristics--

UNITED STATES PATENT OFFICE
CERTIFICATE OF CORRECTION

Patent No. 4,002,837      Dated    January 11, 1977

Inventor(s)   Theran L. Ebner et al.      Page 2 of 2

It is certified that error appears in the above-identified patent and that said Letters Patent are hereby corrected as shown below:

```
Column 11, line 2, change "signAL" to --signal--
Column 12, line 35, after "t" add --o--
Column 13, line 61, change "1." to --2.--
Column 14, line 65, after "produces" insert --signal--
Column 16, line 13, change "clock" to --clocks--
Column 16, line 17, change "enables" to --enable--
Column 16, line 31, change "WIth" to --With--
Column 17, line 12, change "switches" to --switch--
Column 17, line 20, change "betwen" to --between--
Column 19, line 9, change "in" to --is--
```

Signed and Sealed this

Tenth Day of May 1977

[SEAL]

Attest:

RUTH C. MASON
*Attesting Officer*

C. MARSHALL DANN
*Commissioner of Patents and Trademarks*